US010027965B2

(12) United States Patent
Mertens

(10) Patent No.: US 10,027,965 B2
(45) Date of Patent: *Jul. 17, 2018

(54) HDR IMAGE ENCODING AND DECODING METHODS AND DEVICES

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,002

(22) Filed: Oct. 27, 2016

(65) Prior Publication Data
US 2017/0127069 A1 May 4, 2017

Related U.S. Application Data

(63) Continuation of application No. 14/414,153, filed as application No. PCT/IB2013/055384 on Jul. 1, 2013, now Pat. No. 9,516,351.
(Continued)

(51) Int. Cl.
*G06K 9/36* (2006.01)
*H04N 19/196* (2014.01)
(Continued)

(52) U.S. Cl.
CPC ........... *H04N 19/196* (2014.11); *H04N 19/17* (2014.11); *H04N 19/182* (2014.11); *H04N 19/186* (2014.11)

(58) Field of Classification Search
CPC ........ H04N 7/50; H04N 7/30; H04N 7/26244; H04N 7/26313; H04N 7/26079;
(Continued)

(56) References Cited

U.S. PATENT DOCUMENTS 7,172,297 B2  2/2007  Whitehead
8,014,445 B2  9/2011  Segall
(Continued)

FOREIGN PATENT DOCUMENTS

EP  1827024 A1  8/2007
EP  2109321 A2  10/2009
(Continued)

OTHER PUBLICATIONS

Winken et al, "Bit-Depth Scalable Video Coding", Image Processing, ICIP 2007.
Cvetkovic et al, "Tone-Mapping Functions and Multiple-Exposure Techniques for High Dynamic-Range Images", IEEE Transactions on Consumer Electronics, vol. 54, No. 2, May 2008, pp. 904-911.

*Primary Examiner* — Duy M Dang

(57) ABSTRACT

To have a very efficient and in some embodiments also backwards compatible with legacy LDR display systems, apparatuses and methods relating to decoding an image encoding (LDR_CONT) corresponding to a first luminance dynamic range (R_oLDR) into a second luminance dynamic range (R_oHDR) output image (HDR_FIN), in which image encoding (LDR_CONT) are encoded pixels of an original image (HDR_ORIG) of a high dynamic range scene, the method comprising:
tone mapping with a predetermined tone mapping strategy (FL2H) at least the lumas of pixels in the image encoding (LDR_CONT) onto lumas of pixels in an intermediate image (HDR_PRED) corresponding to the second luminance dynamic range (R_oHDR); and
modifying the lumas of at least some of the pixels of the intermediate image (HDR_PRED) by multiplying them with predetermined multiplication factors, resulting in the output image (HDR_FIN) are taught.

24 Claims, 9 Drawing Sheets

Related U.S. Application Data

(60) Provisional application No. 61/671,183, filed on Jul. 13, 2012.

(51) Int. Cl.
  *H04N 19/182* (2014.01)
  *H04N 19/186* (2014.01)
  *H04N 19/17* (2014.01)

(58) Field of Classification Search
  CPC ........ G06K 9/645; G06K 9/6202; G06K 9/03; G06K 9/20; G06K 9/32
  See application file for complete search history.

(56) References Cited

U.S. PATENT DOCUMENTS

| | | |
|---|---|---|
| 9,420,288 B2 | 8/2016 | Mertens |
| 9,516,351 B2 * | 12/2016 | Mertens ................ H04N 19/46 |
| 2010/0157078 A1 | 6/2010 | Atanassov |

FOREIGN PATENT DOCUMENTS

| | | |
|---|---|---|
| JP | 2006211152 A | 8/2006 |
| RU | 2433477 C1 | 11/2011 |
| WO | 2007082562 A2 | 7/2007 |
| WO | 2010105036 A1 | 9/2010 |
| WO | 201107905 A1 | 9/2011 |
| WO | 2012147022 A2 | 11/2012 |

* cited by examiner

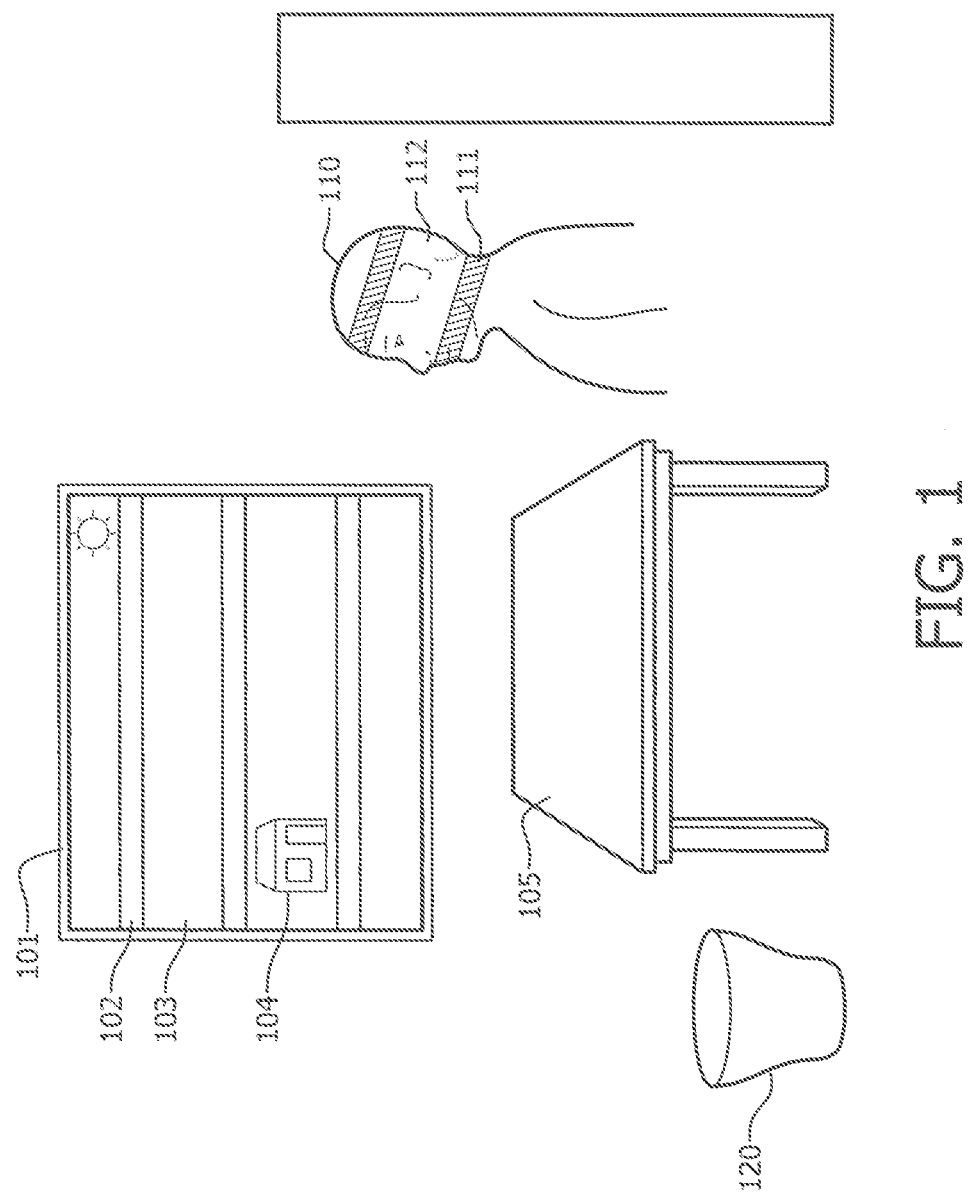

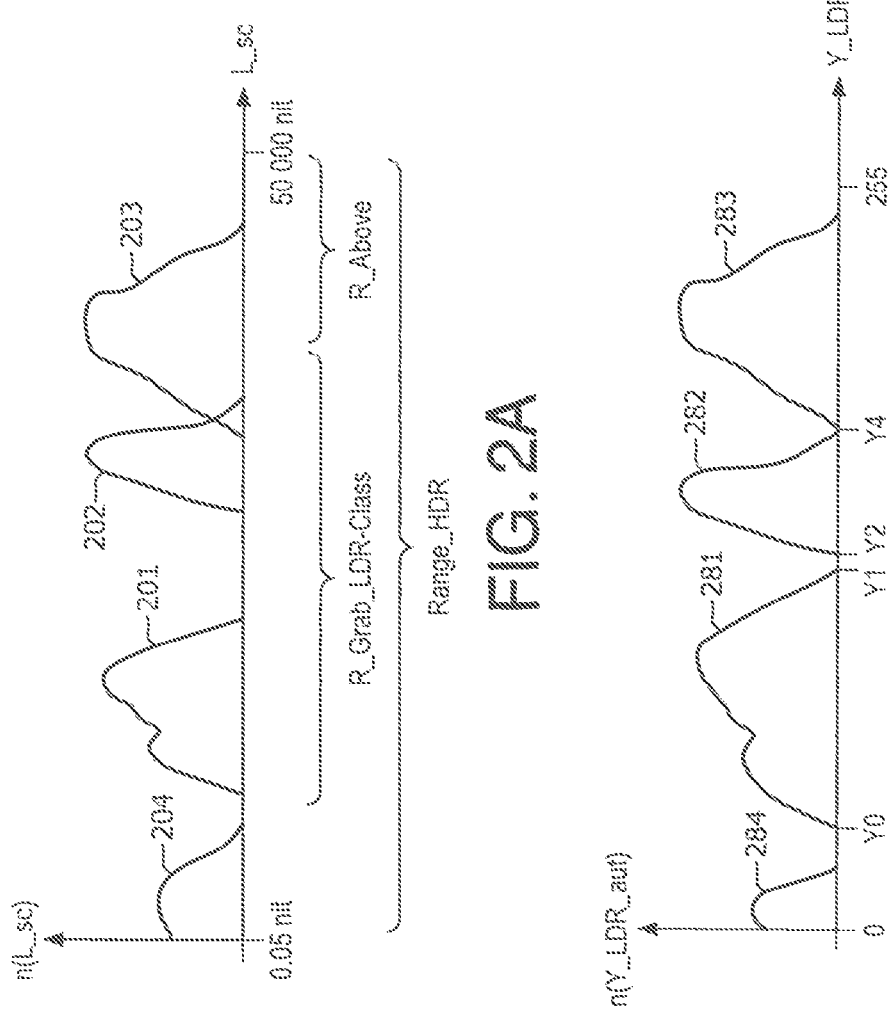

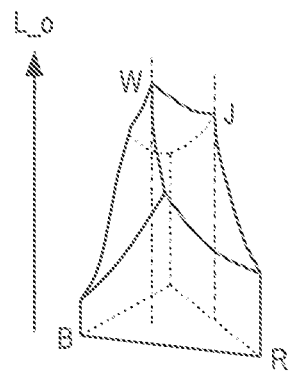
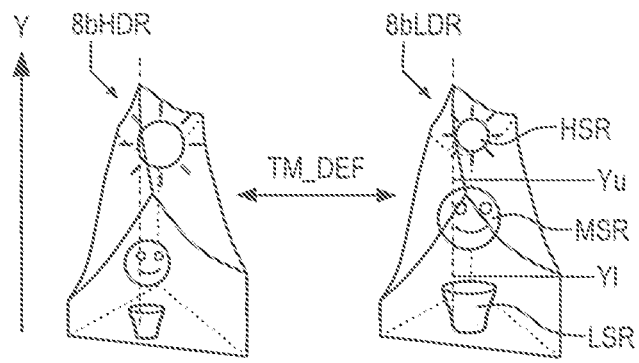
FIG. 6A          FIG. 6B
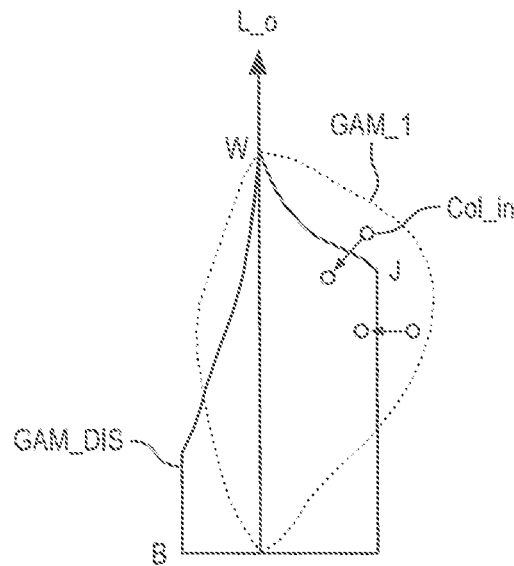
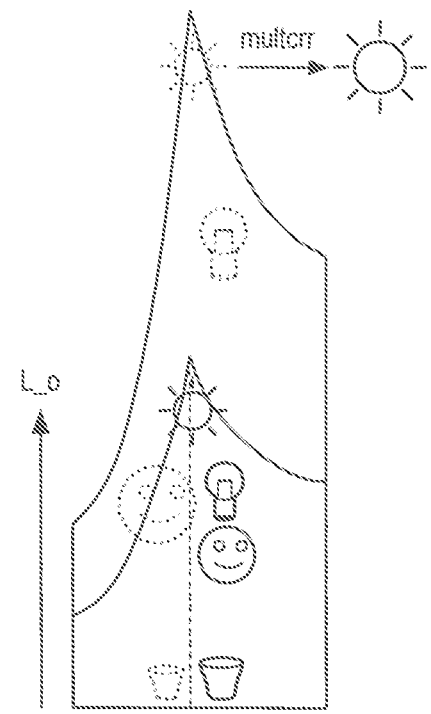
FIG. 6C          FIG. 6D

HDR IMAGE ENCODING AND DECODING METHODS AND DEVICES

CROSS-REFERENCE TO PRIOR APPLICATIONS

This application claims the benefit or priority of and describes relationships between the following applications: wherein this application is a continuation of U.S. patent application Ser. No. 14/414,153, filed Jan. 12, 2015, which is the National Stage of International Application No. PCT/IB2013/055384, filed Jul. 1, 2013, which claims the priority of U.S. application 61/671,183 filed Jul. 13, 2012, all of which are incorporated herein in whole by reference.

FIELD OF THE INVENTION

The invention relates to apparatuses and methods and resulting products like data storage products or encoded signals, e.g. as stored in memories, for improved encoding of at least one image or video with an increased dynamic luminance range compared to legacy images called low dynamic range (LDR) images.

BACKGROUND OF THE INVENTION

Recently image capturing, displaying and in particular encoding has improved from so-called low dynamic range (LDR) imaging (such as classical systems like PAL or MPEG2) to so-called high dynamic range imaging (HDR). Sensors have nowadays either a higher native signal voltage range (between the scene luminance that saturates, or at least gives the maximally allowed pixel voltage, and the minimum, or alternatively typical noise level), or they have techniques for stretching that sensor range by composing resultant images from multiple images, e.g. from spatial systems with different sensitivity, or successive pictures with different exposure setting. The difference with an LDR camera capturing is that such an LDR camera typically clips and/or soft clips some areas, like the bright luminances outside becoming white (the luma Y of those stored encoded LDR image pixels being 255), whereas a HDR capturing system can reasonably faithfully capture all luminances in the scene. Although it is then still a question what to do with them, i.e. how to encode them for e.g. transmission over a television network system, and how to (faithfully, or in a preferred way or at least acceptably) render them, on e.g. a HDR display, which has higher peak brightness than the typical peak brightnesses of LDR displays (e.g. 3000 nit, instead of 100 or 500 nit).

Since the look of a rendering of a picture depends on many variables such as i.a. the contents in the picture, the kind of display rendered on (such as its peak brightness), and the viewing environment, typically the captured raw sensor picture (which may be tightly related to the original scene, but has absolutely no relation with the final rendering environment, so no information regarding how a human will see these two scenarios) undergoes a transformation of its pixel colors, which is called a grading. Typically this may be a human grader. E.g. in a movie production it may be difficult to accurately light a house interior (also given timing and pricing constraints), let alone create thunder clouds of a particular greyness pattern. The scene lighting crew may then go for an approximately correct lighting, which at least creates "enough" or "the right amount of" light everywhere, and may position the practicals (e.g. atmosphere lighting like candles on a table (or something simulating that), a neon billboard, etc.). But a grader then improves upon that in image processing software, e.g. he may draw sunbeams as if the fell through the window in the actual scene.

LDR encoding had another property characterizing it. Naively one may think LDR is just encoding in which the lumas have an 8 bit code word per pixel (or similar embodiments of course), and vice versa 8 bit means LDR. But in theory one could encode whatever in those image arrays of 8 bit codes, so very complex patterns could be encoded at least in theory, so why not HDR images.

The issue was, and that's partially the legacy of a long historical tradition, that the sensor voltages (i.e. linear representations of the scene luminances) were encoded into the 8 bit code words according to a particular code mapping function. This was a simple, not too non-linear monotonous and continuous function, namely a gamma 2.2. The idea was that this tight linking of capturing, coding and rendering through such a direct connection system, would amount to the correctly doing the grading almost automatically. The signal was directly applied to the cathodes of a CRT display, and it was due to this CRT physics that the gamma 2.2 was chosen (which incidentally also gave a reasonably uniform psychovisual brightness scale to work with). If there was only a single type of display, it would correctly render the driving values into output luminance, if only it was driving by driving signals being the LDR signal. And that was automatically pregraded with a compensating gamma, namely approximately 1/2.2, straight from the camera. But also, should any grading artist on the creation side want to finetune or improve the pixel colors, he would do so while watching the signal on exactly the same CRT on the creation side, so the consumer home t.v. would give approximately exactly the same rendering (apart from surround effects on the viewer), because it was driven by that same corrected image.

In any case, this LDR encoding chain functioned as a closed specification, in which rendering and encoding (or grading) amounted to the same thing. Nowadays, having very different displays, like an LCD at home, an Ipad for watching image content on the train, a home projector, and recently very high brightness HDR displays, necessitates that rendering or gamut mapping should be a phase totally separate from image encoding, since given the same input images, these displays will show quite a variation among their output looks, which may be more severe than desirable.

But in any case, on the content creation side, e.g. between camera and encoding, this tight link was still followed in LDR systems. Although modern consumer cameras (especially since recently they start incorporating HDR functionality) may use a more sophisticated code mapping function than a gamma 2.2, they still have relatively similar functions, which are not highly non-linear, i.e. not so different that we cannot approximate many aspects of their mathematical behavior with a linear analysis.

In particular this is seen when a scene of higher luminance range has to be captured, such as e.g. of a person sitting in a car. A combination of factors such as exposure of the person's face, and the code mapping function (e.g. an S-curve), typically leads to the fact that if one exposes well for the interior of the car, that the outside can only be represented with pastellish colors near the upper boundary of the code gamut, i.e. with lumas near 255. That is because the camera or cameraman e.g. chooses to have the face color code mapped near average grey, let's say for simplicity value 128. If we approximate that the mapping function around this value is a square function, then value 255 can only represent outside lumas of 4× higher. Of course the actual values will depend on how smart the camera system (inclusive the human operator choices) will handle such bright regions, and an appropriate shoulder in the code mapping may still at least allocate different code values to higher scene luminances than 4× the luminance of the face (although it must also be said that in reality quite some of the content quickly produced when shooting on location without much preparation, clips a significant part of the image to 255, and it is questionable whether that is so desirable).

In anyway, as a rough measure one can say that above luminance ratios of 500:1 (or at least 1000:1), LDR encoding becomes problematic, and we enter the HDR encoding technology field, at least if we want to encode the scene right. So this happens with geometric form factors which create an illumination unevenness of about 5-10 to 1, highlight to shadow, since reflections of objects typically range between 1% and 100%. Such an illumination reduction can already happen in a room a couple of meters away from the window.

An example of a high dynamic range scene, which also clearly manifests a distinct color scheme to the human viewer, is a dusk cityscape. The whites have become light greys to human vision, and white seems to be missing in the scene, as the lights already jump to a brightness level above that ("light"). I.e., one would like to be able to show these on a HDR display as light objects, and also code them in a way that they can clearly be recognized (especially by renderers which don't directly apply the input signal as driving signal, but do some gamut mapping optimization) as lights. Note that because of the decoupling of the camera-capturing, coding, and display, one should make careful discriminations as to which dynamic ranges one specifies (and they should not always be luminance contrast), since a particular e.g. 100000:1 dynamic range scene may not necessarily need the same contrast when rendering (e.g. the sun on the display need not actually be able to hurt your eyes), the actual relevant factor being the psychovisual reasonable similar appearance. Let alone that in a generic, highly non-linear encoding this should say anything about a dynamic range of a codec, since such factors like particular mapping or coding/rendering precision may all have an influence on that. As to display rendering, one knows one has a HDR display system, if it can render in particular light effects which could not be rendered faithfully on LDR display, such as real shining lamps, or real-looking sunlighting of outdoors scenes. And in particular the lightnesses of other scene objects (e.g. indoors furniture) are coordinated with that, i.e. given such lumas that a good appearance results for both the light and normal/darker objects (human vision being relative).

The (native) solution first envisioned for HDR image encoding, was i.a. conceived by people working in the computer graphics arena, since in a computer any kind of signal can be made (without capturing lens limitations, in a computer the universe next to a supernova can really have a zero luminance, also without any captured photon noise). In that framework being able to totally abandon any previous television technology constraint, a logical solution would be just to encode the scene luminances linearly. This would mean that a higher amount of code bits were needed for the pixel lumas, e.g. 16 or 32. Apart from the higher amount of data, which may for video sometimes be an issue, as said above, such native encoding has absolutely no link (or embedded technological knowledge, like additional values, measurements, or knowledge included in equations, which could be co-encoded as metadata together with or separate but linkable to the encoded pixel image) with the rest of the imaging chain, i.e. the rendering system.

An alternative second way of encoding was inspired by or at least conceptually relatable to dual display systems, like dual LCD panel displays, or single panel LCDs with a 2D modulatable backlight. In these systems, the final output is a multiplication of the light pattern produced by the back layer display and the transmission of the front LCD. The question is then how to drive both signals, given that e.g. we have as above a native 16 bit (at least luma) HDR encoding, and a standard driver electronics and physical modulation capability of the LCD of say 8 bit (which means on a linear transmission the LCD can make a black of 1/255 of its full transmission, and potentially somewhat different values for non-linear behavior; and say e.g. the backlight is also modulatable by 8 linear bits). A simple solution would then be to take the square root of the pixel lumas, and send 2× this square root to the two drivers. In principle any multiplicative decomposition would (theoretically) do. E.g., if the LCD could only vary the transmission in 4 steps (2 bit linear), one could still make the exact HDR system, if only one drives the backlight with a signal giving the remainder of a division:

$$Y\_backlight=Y\_HDR/Y\_LCD,$$

in which the Y_LCD would in this example more brightly or darkly modulate what light is behind in 4 different ways (e.g maximally block, which may be e.g. transmit 1/80th of the light behind, vs. transmit 100% and 2 equidistant transmissions in between).

The Y_HDR would be the 16 bit signal, in which the maximum value would signify some very bright scene luminance, approximately renderable by switching the backlight of the display (locally) to its maximum value (taking into account heating, aging, etc.). So, again using a linear coding because that is how the rendering works physically, the backlight would need to make a range of 1/4th the 16 bit (65536 linear steps to be made), which (again if we suppose we need a linear coding and equidistant driving) means the backlight will be driven by a 14 bit signal (if such precision is needed). The backlight can hence change the local value into the LCD valve by any factor needed to render the HDR image. In fact, since these displays contained a far smaller number of LED backlight elements than pixels, some approximation of the image was rendered, by driving the backlight according to some average illumination. So e.g. like in claim 2 of U.S. Pat. No. 7,172,297 of the university of British Columbia, one first calculated the average luma of the local image pixels, and this resulted in a backlight value approximating the needed rendering, and then one set the LCD pixels as the division of the Y_HDR and this approximation. So the interesting property of this multiplication, is that it corresponds to a reduction in the linear bits to encode one of the images, which can be mathematically seen as some kind of range compression, or gamut mapping.

So one elaborated further on this, namely, to encode any HDR picture based on such a multiplicative scheme (not necessarily for a real two-layer display). I.e. one could form a first picture by doing some generic tone mapping, and create a standard JPEG picture (Y_JPEG) from this mapped resulting 8 bit image. And then one stores a second picture, which is the ratio image Y_HDR/Y_JPEG. So at the decoder side, one can then use the normal LDR JPEG picture, or recreate a HDR picture by multiplying the two LDR pictures (assuming the original was 16 bit yielding two 8 bit pictures, which is in general sufficient for most if not any HDR scene or scenario). A first disadvantage of this method is that, although any HDR image can so be encoded (by correcting whatever is in the JPEG picture in the ratio picture, or at least coming to a reasonable approximation should the JPEG be so badly encoded that the resulting correction goes over the possible range, which could happen e.g. if two adjacent pixels are chosen to be 1 in the JPEG, but should be 230 resp. 350 in the HDR, again assuming linearity), but at the price of needing to encode 2 pictures. Having no savings by any mathematical correlation, apart from needing the surrounding semantics to format those two pictures, one would prima facie seem to need the same amount of bits as when storing a single 16 bit image (at least if one doesn't spatially subsample etc.). Secondly, this "blind" decomposition has nothing to do with the physics of the actual renderer, or physical or psychovisual semantic laws present in the rendered scene (such as which object is merely a bright lamp), rather it merely results from a multiplicative correction of whatever one has chosen to become the JPEG base image. But it is a nice backwards compatible strategy to encode images.

A third way of coding could be traced from a history of prediction-correction scalable codings, in which a prediction is corrected by an additive correction image. Originally this happened in inter alia SNR scalability, and the first image was an approximation, which may contain rounded or quantized versions of the pixel lumas. Onto that was added a picture which added further precision (note that other variants could contain e.g. a spatial approximation, which could also be corrected by adding a correction signal, which then would also restore high frequencies, e.g. at boundaries). So if e.g. the original (LDR) signal to be encoded had spatially adjacent pixels 127, 144, one could e.g. encode an approximation of 6 bits with precision steps of 4, giving pixel values 128 and 144. One could then correct this with an image of higher precision containing the values −1 and 0. Since the approximation was already largely good, the range of the correction signal should be lower, which could result in bit savings.

Since range and precision within a range can in principle be interchanged, one could also envisage using such a technique for encoding HDR images. In fact, one could define the maximum of any coding range (also an 8 bit encoding) to correspond with whatever scene luminance. But this was seen to be probably only reasonable for larger than 8 bit encodings, given the amount of brightness steps in HDR scenes. Also, mere scalability does not imply any change in tone mapping, i.e. by definition just handles the precision of lumas question, but does not state anything as to how a particular LDR encoding would relate to any HDR encoding, or how any encoded image would need to be optimally rendered on any display (without e.g. being rendered too dark in general on a display of lower peak brightness).

Further building on this concept, a two-layer HDR encoding method was developed as in WO2007/082562 (see FIG. 1). In such an encoder, one recognizes there is a relationship between HDR and LDR, as it may be captured, encoded (e.g. by means of gamut mapping), or typically graded (typically by an artist grader, working for the content producer). E.g., since an LDR gamut (as defined by what a typical LDR display of say 400 nit would render) may not be able to contain bright regions faithfully, such as a sunny outdoors, one may map to the LDR space such a region by lowering its lumas (and potentially also decreasing color saturation). Making a HDR image from such an LDR encoding of the original scene, would involve mapping pixel lumas/colors of those bright outdoors regions of the image to higher brightnesses (or in other words predicting what a HDR graded image could be like), e.g. by offsetting those LDR lumas by adding a fixed or LDR-luma-dependent brightness, or in general applying a mapping function to at least the lumas: Y_HDR=f(Y_LDR). One would at least get a more HDR-ish look, but how close this prediction would be to the original HDR grade, would strongly depend i.a. on the correctness (and complexity) of the mapping/prediction function. Because of the high complexity of an image (making people normally choose for a simpler prediction, e.g. a global tone mapping which maps each pixel luma solely on the luma value and no other factors like the spatial position of the pixel in the image, rather than a more complex one which doesn't fully accurately predict the original HDR image anyway), there will be a difference, and this will be a difference image. So these two layer methods will also encode this image. Because the difference between an LDR grade (which in principle doesn't even have to be close or similar to the HDR grade, but could be anything) and an HDR grade is entirely different from a difference between an X bit accuracy and an X+Y bit accurate representation of a signal, these difference images need not have a restricted range of values. They could in principle be anything, even up to a 16 bit image like the original HDR instead of a 8 bit difference image, e.g. if the prediction was so bad to predict successive zeroes for the pixel lumas, whereas the HDR pixel lumas would e.g. be 65000, 65004 etc. (although such a worst case scenario is so unlikely one could constrain the codec to just make mistakes in that case). In any case, testing some of those predictive codecs with a correction picture, we found that they may require a large amount of encoded data, and that in particular this data may encode image information which is not really so relevant to the HDR experience, such as e.g. a correction of prediction model errors which mapped the HDR lumas in the wrong direction, or noise or image structures which are not so relevant psychovisually, or at least not the most important image structures contributing to the HDR impact (in a hierarchy of HDR relevance, e.g. a flame may be important, and that look may already be encoded by few, well-chosen data words).

So it is an object of the below presented technologies to provide HDR encoding techniques (i.e. any encoding techniques of a higher quality of image regions along a luma range than classical LDR) which give a better control over the encoding of at least some if not all HDR aspects in a scene (i.e. lights, lighting of objects such as sunlighting of certain image regions, improved rendering of certain aspects such as local contrast, etc.), leading to such potential advantages as e.g. a lower bit rate, or at least more significant information in the hierarchy of encoded bits.

SUMMARY OF THE INVENTION

Some of the issues of the object are handled by a method of decoding an image encoding (LDR_CONT) corresponding to a first luminance dynamic range (R_oLDR) into a second luminance dynamic range (R_oHDR) output image (HDR_FIN), in which image encoding (LDR_CONT) are encoded pixels of an original image (HDR_ORIG) of a high dynamic range scene, the method comprising:
tone mapping with a predetermined tone mapping strategy (FL2H) at least the lumas of pixels in the image encoding (LDR_CONT) onto lumas of pixels in an intermediate image (HDR_PRED) corresponding to the second luminance dynamic range (R_oHDR); and modifying the lumas of at least some of the pixels of the intermediate image (HDR_PRED) by multiplying them with predetermined multiplication factors, resulting in the output image (HDR_FIN).

By encoding pixels we mean of course the information of those pixels (since a pixel is a texture color sampling for a particular sampling position, as defined in a chosen colorimetric system), i.e. the image object textures they represent, i.e. color representations (e.g. YCrCb or RGB) of those pixels. But LDR_CONT doesn't contain the actual representation in a color encoding of the original HDR image (even if that were to be encoded as an 3×8 bit image), but rather a transformation of those colors in new colors which are stored in LDR_CONT, which new colors however still contain the spatial-statistical color information required for rendering the original image. So the pixels still represent the same geometric image object structure, but with a different colorimetric look if rendered on a particular display than the original HDR image being input (but information theoretically, desptite whatever colorimetric transformation, the same information as in the original image, i.e. a good capturing of the information in the HDR scene, is nearly all still present in the image encoding LDR_CONT, and re-obtainable, at least with additional metadata, and in particular that metadata according to the present inventive embodiments). By a dynamic range corresponding with or being associated with an image, we mean that it is intended for rendering on a display of a particular dynamic range primarily, or displays of similar range (the precise difference between a dynamic range of a rendering, defining the meaning of an encoding in such a way, and what people usually consider as the dynamic range of a e.g. 8 bit luma encoding, which makes only sense for linear encodings, is explained below). By tone mapping strategy we mean e.g. a simple global tone mapping function, or any e.g. algorithm which ultimately changes the pixel colors of the image encoding into those of the output image.

A very interesting way to realize such a system with a backwards compatible directly usable LDR signal is a method of decoding an encoding of a high dynamic range (input or master) image or video signal into a high dynamic range output image or video signal, the method comprising:

tone mapping with a predetermined tone mapping function at least the lumas of pixels in the encoding onto lumas of HDR pixels in the high dynamic range intermediate image; and modifying the lumas of at least some of the HDR pixels of that intermediate image by multiplying them with predetermined multiplicative factors.

With encoding we mean any representation of an image of a scene, not necessarily compressed, but in particular smartly using the properties of the HDR scene in its representation (e.g. allocating a luma subrange to average greyness objects and another subrange for light effects). For simplicity we will focus on luma, since prescribing the lightness values of objects is the more important factor for visual quality, the colors around that having some lesser influence (e.g. because we don't know the color of the shirt of the newsreader). So if we need to make deformation errors e.g. because of gamut shape issues, we can better make them in the chromatic direction. The skilled person knows that we can also specify the chromatic aspects of color around this luma axis, be it by specifying gamut mapped chromas (e.g. some hue and saturation function) around the prescribed lumas, or by working on three R,G,B axis instead of on a luma, chroma color representation, etc.

Because this is not the core of the invention, we will not elaborate on that. The skilled person understands that the operations which can be done on a luma channel (mapping and modifying) can of course also be done on another color channel, like the Red channel. With signal one may understand how the image data is formatted according to some standard, especially when further metadata is added, whereas image in our description can be understood as a raw array of pixel colors (but the invention can be easily understood in both formulations).

We will describe the basic method for a useful application in which we encode HDR scenes primarily (there is at least a transformation function co-encoded, but some HDR high-brightness regions could e.g. be encoded in an auxiliary way, such as with a local replacement picture, to give a set of spatially local pixels at the decoder side) as a 8 bit legacy image (i.e. e.g. encoded by means of an MPEG-AVC encoding), which we will call "HDR_encoded_as_LDR" (or one could also call it an "LDR_container" encoding, as the HDR is packaged in an LDR framework). The encoding in this example will be e.g. an LDR MPEG or JPEG, containing the information of a master high dynamic range input video signal, e.g. 16 bit linear. One can understand why such an encoding may work in many scenarios. Although for the utmost quality avoiding banding on fine gradients, or a very fine texture of objects, even more than 8 bits may be desirable for the present display brightnesses and sizes. However, for complex object textures which move fast in an image, a 6 bit approximation may already be reasonable. So any mapping which compresses a significant luma subrange in no less than 6 bits may do fine. For the entire range, dropping from 8 to 6 bits by mapping between an LDR and HDR 8 bit grading would allow already linear stretches or gammas which dim by a factor 4, or 2 stops. Especially for applications were bandwidth/memory or bit rate is somewhat critical, it may be wise to have an encoding allowing already most of the HDR features at very reasonably quality, be it not of maximum possible quality, needing many more bits (and probably even for many so-called high quality applications greater artefacts are made anyway by e.g. inappropriately or critically tuning the quantizers of the DCT coefficients, etc.).

One should carefully ponder to understand the important difference for the present teachings (which is not a commonly understood insight) between a signal encoded for (e.g. to be usable on by directly applying the signal as a driving signal) a particular luminance range like an LDR range, and the information it actually contains. Because we have totally decoupled the encoding and rendering, this can be done. It only has to do with shifting the information in luma subranges to appropriate levels along the [0.1] or [min luma, max luma] range for correct rendering on a particular display. E.g., the encoding may be so constructed (e.g. human graded) to give a nice looking picture on an LDR display (note also that we describe the ranges corresponding to encodings with luminances rather than lumas, the luminances being the linear output results an image encoding corresponds with when ultimately rendered, whereas a luma is the actual encoding, which could in theory be anything, e.g. luminance 0.1 nit could be encoded by luma 32, and luminance 200 nit by luma 0). This means that we e.g. have graded the darker regions so that there is still sufficient structure visible on a low peak brightness e.g. 100 nit display, rather than visually confusing everything in a hardly discriminable black. But that image grading won't be very usable for HDR rendering, since e.g. the darker image regions may be considered far too bright for conveying the right scene mood. However, now note that this LDR graded image (which the right dark region behavior etc.), may both comprise information (i.e. pixel luma spatial variation structures) of a lower original scene range or subrange, or of a higher luminance (sub)range. E.g., one could make an LDR signal by just using a simple camera which clips sunny outside regions to maximum white (255), yet still having the same dark and midregion luma values. Or one could use an intelligent gamut mapping algorithm, which includes some of the originally captured textures of those sunny outside regions. It may squeeze those in the low dynamic range of the LDR image (one usually thinks of squeezing in less bits, but the more important question is how to allocate subregions of the tent-shaped luma, hue, saturation gamuts which correspond to an encoding) making some errors in the sense that such a scene can never be faithfully rendered on an LDR display system. But nevertheless, apart from rounding errors, the HDR information is still there. I.e. it is in the LDR encoding in such a way it is directly renderable (a pastellish outside region of more or less the same average luminance as the darker interior being far better than a clipping anyway). But the HDR information being in the encoding, it is hence also usable for HDR rendering, but then of course first the appropriate tone mapping to obtain the correct-looking output image is required. But note that alternative to this very useful backwards-compatible system of encoding HDR scenes as a LDR usable signal, i.e. having the correct look when directly applied on an LDR display, the same technical teachings of our invention can be used the other way around.

I.e., one could have also e.g. an 8 bit encoding, but which is now graded for direct use on an HDR display of say 3500 nit. I.e. this signal will be differently graded, in that it will typically e.g. have smaller lumas for the darker luminance regions. In this case one would not need to recover an HDR signal (i.e. for an HDR luminance range renderer) from an LDR signal, but one would derive an LDR signal for a legacy display from the 8 bit HDR grading by applying a tone mapping which would have largely an inverse character (e.g. stretching the darker lumas instead of compressing them). The tone mapping function would be similarly co-encoded in metadata, but be roughly of an opposite shape (compressing instead of stretching). And then one would apply our multiplicative modifications to the LDR prediction rather than an HDR prediction. Of course the method may work on any other system where prediction is largely sufficient, but still some correction with little additional bits for predominant effect is desired for at least some scenarios, i.e. for some parts of some images. E.g. dropping the legacy 8 bit encoding constraint, it is still sensible to tone map HDR to e.g. a 10 bit container, and then re-obtain HDR for any reference display (peak brightness) by stretching tone mapping, and then applying some multiplicative finetunings. So it should now be clear how the method works as a most useful predominant correction on systems with tone mappings between encodings of different first and second luminance ranges.

It should be clear what is meant with an image signal, that this is any of the existing or similar ways to pack image data, with e.g. typically containing such metadata like descriptors for the meaning of the data like e.g. the image aspect ratio, and further metadata containing useful information relating to the encoded image, such as for modifying it, etc.

Contrasting to the enhancement methods which rather logically encode the remaining DIFFERENCE of the original and the prediction (i.e. what should still be encoded), which methods focus highly on precision, and waste bits which have little or no impact on the final HDR look, we preferredly focus on the more important bits, preferably quickly giving a marked HDR impression increase. E.g., HDR_encoded_as_LDR encodings may work since one may sacrifice precision for range. In principle one may say that one needs more than 8 bits for accurately rendering grey values especially on high brightness display, since otherwise one risks seeing some banding. An alternative way of looking at the problem is to consider how bad such theoretical errors are in practice, for the human visual experience. In highly textured regions these quantization errors will usually not be highly noticeable, especially not in moving video. Even if they occur in some scenes e.g. in background gradients, although they may be seen as annoyances, the question is of course how serious such artifacts are compared to other artifacts. E.g. in a lower capacity or bandwidth medium, it may be the most important visual factor to be able to render the HDR look, and if there are already such artifacts like DCT blocking artifacts, some occasional banding may be acceptable. HDR encoding then has more to do with the correct allocation of lumas/lightnesses of scene objects and corresponding encoding techniques like tone mapping functions, than with precision. In fact it could be stated that 6 bits/channel is already a relatively good amount of data precision for LDR, and then 8 bits would allow higher luminances ranges. In fact the two additional bits allow a factor 4 extra, which can be used as additional luma range rather than precision (e.g. allocate 4 different luma subranges for various scene regions, such as "dark shadow", "average grey/normally lit" "brighter region (e.g. for outside sunny regions)" and "overbright" and then encode the various objects therein).

But more importantly, by having good control one can tune the tone mapping functions, and thereby optimally allocate the required subregions. In this way they needn't all have a subrange equivalent to 6 bit precision, but if some important subrange (e.g. the main (average grey) range in which the actor resides) needs more precision, that can be taken at the cost of another range, where not much is going on in the scene e.g. (e.g. one could encode the bright lights with only a couple of codes).

This gives a high versatility of trying to identify a HDR grading with an LDR grading. In the elucidation we will assume a scenario where it works even better, namely deriving an LDR from that HDR. One hence maps with a tone mapping which in principle is (fully or at least mostly) reversible the HDR lumas to LDR lumas. One may trade-off such factors like making the so obtained LDR grading look similar to the HDR grading (as far as the lower brightness gamut of an LDR display allows), and keeping enough precision for various (especially when important) luma subranges corresponding to spatial subregions or objects.

Now this mapping can then be inverted, so one can reconstruct an HDR image out of the LDR encoding, by tone mapping with a predetermined tone mapping function being that inverse function of the grading from the master HDR grade to that e.g. HDR_encoded_as_LDR grading (e.g. if a gamma 0.33 function is used to reallocate the values in a standard [0,1] float representation to obtain [0,255] LDR lumas, then to reconstruct the HDR a gamma of 3 would be used). In principle one could fully recover the HDR signal. But there may be some issues. Since one would like to be able to use the LDR grading as a good looking legacy video signal on legacy LDR displays, and given that it is calculated from an HDR signal (which may e.g. have very high contrast in some regions to emphasize the HDR, or conversely, after mapping to a low brightness range, too low contrast in some other regions), it may happen that the LDR looks not as desired. Of course the grader can then trade-off. He can try to further tune the tone mapping function, until the LDR looks reasonable, and also the reconstructed HDR is still of sufficient visual quality. But it may also be that the grader departs considerably from this, and makes a different LDR grade. At least in some region, e.g. he may start recoloring arbitrarily the pixels of some face. In such cases the prediction back to HDR from the LDR signal will not only not look reasonably close (whether determined with a mathematical criterion like PSNR, or a psychovisual one) to the original master HDR grade (which was supposed to be encoded in this HDR_encoded_as_LDR grading), but more seriously, it may be significantly different, giving a different HDR look, or even no HDR effect, or serious visual artifacts in the HDR rendering, etc. So in such cases the HDR reconstruction will have to be further modified. According to the present invention we argue that one best not used just any modification, but one with high impact, and in particular taking into account that many times the HDR reconstruction will already be relatively close that what is desirable, perhaps not according to a PSNR value, but psychovisually.

One could classify corrections in at least two useful types. Either the lumas of the reconstructed HDR image are seriously off, e.g. the pixel luma Y_HDR_RECONSTR is 1024 where it should be Y_HDR_MASTR 2048. Or a minor correction should be done, e.g. to bring somewhat more contrast or texture in the object. Instead of making small changes, the changes could be done according to a visual importance hierarchy, and in particular both scenarios could be handled with a multiplicative correction. Even if Y_HDR_MASTR of the original HDR to be encoded was 2000, one could multiply the HDR pixel reconstructed by tone mapping from the HDR_encoded_as_LDR pixel by a factor of 2. This would still involve an error of 48 (or 2%), but that is far better than the original 100% error. And such a small error is most likely not very important psychovisually anyway (given there is always image noise, e.g. due to photon noise, etc.). If one had too low a contrast in the LDR encoding, which was also not sufficiently recovered by the tone mapping to HDR, one could increase it by multiplying by e.g. 1.5 correcting for the difference of original and modified local average (or the difference of the multiplied and unmodified first pixel), modifying pixels 450, 452, 449 into 675, 678 and 674, and then 450, 453, 449. The former example having a multiplicative correction for a spatial succession or run of neighbouring pixels, one could also specify a multiplicative correction pattern per pixel. In that scenario one could even bring in textures, e.g. which were totally lost by rounding in the lower precision LDR color space. E.g., one could again multiply without changing the average brightness the fixed luma 980 by 2.3, 4, 3.8, 1.2 etc.

Various embodiments will encode the required multiplicative corrections in different, smartly optimized ways. E.g., taking a lower precision, most important HDR effects first view, one does not need arbitrary multiplication factors like 1.222235, and can hence encode this additional data needing only few additional bits. In particular this amount of bits should not be changed to much beyond the HDR_encoded_as_LDR encoding (which is already very efficient), since the modification is expected to be needed only at some times for some (parts of) images, since in many cases, although there may be some differences, the grader may conclude improvement is not necessary. But the parts which are encoded will then typically be important HDR looks (e.g. making a metal object look more shiny, contrasty, etc.), or HDR effects, or mitigation of coding artifacts which are considered objectionable, etc. Note that we intend to cover also scenarios were the multiplication acts on the lumas indirectly via modification of e.g. the color channels R,G,B, but adding those distinctions to the claim will make it hardly readable.

Some interesting variants on the principle are inter alia the below.

A method of decoding an image encoding in which the predetermined multiplication factors are stored in metadata associated with the image encoding (LDR_CONT), the method of decoding comprising reading in the metadata information defining a spatial region of the image encoding (LDR_CONT) for which at least one multiplication factor is encoded in the metadata, of which spatial region a geometric shape is encoded (503, 504, 505) in the metadata.

It can be understood the geometric regions can be encoded in many ways, e.g. one could define an ellipse with centre (x,y) and two axis, in which corresponding region of the intermediate image as predicted by the first tone mapping strategy has to be multiplicatively modified with e.g. a single multiplication factor, or one may compose it out of subregions in which e.g. per 10 pixels a different multiplication factor is to be used.

A method of decoding an image encoding, in which the predetermined multiplication factors are comprised in an array of multiplication factors (506) comprising a multiplication factor per pixel or group of pixels, in which the array is defined in correspondence with the encoding of the spatial region geometric shape.

E.g., one may order one multiplication factor per pixel in a 1D array which corresponds to scanning lines as the fall in the ellipse, e.g. in the first line 2 pixels, then 6, etc. But also one may define the relationship so that e.g. a multiplication factor is to be used for e.g. 2 successive pixels in the geometric region.

A method of decoding an image encoding, in which the multiplication factors in the array of multiplication factors (506) are encoded as indices into a definition table (520), which contains actual multiplication factors for the indices.

This allows to use only a couple of indices for encoding the most useful actual multiplication factors. In this way the array 506 may e.g. be encoded with only 4 bit per multiplication factor.

A method of decoding an image encoding, in which the definition table (520) is associated with a descriptor (530), which characterizes the definition table, and therewith in which cases of modifying the lumas it should be used, such as e.g. on a particular shot of images.

Giving a descriptor to multiplication factors allows them to be used or (re)used on particular predefined scenarios. E.g. one may at the very beginning of the movie encoding, define a defintion table (520) which is to be used on a particular class of dark environment regions, wherever they occur in the movie. But another such dark environment region class may use another table. One may further determine them conditionally, e.g. in the current shot the selected table should be used, but e.g. only if the pixel luma of HDR_PRED is below a value Lx (in other cases one could ignore the multiplication factors, even if they are encoded), or some of the encoded indices could be ignored, which allows re-using a table, and may be specified before this shot of images as e.g. "don't use 29-31", etc. This also allows transcoding a previously graded and coded image signal S_im.

A method of decoding an image encoding, in which the decoding further reads a window type (531), indicating that a spatial region associated with that window type (531) has multiplication factors encoded by means of a definition table associated with a descriptor (530) with corresponds with the window type (531). This can be used to more tightly link definition tables or parts thereof with parts of image(s).

A method of decoding an image encoding, in which the modifying the lumas of at least some of the pixels of the intermediate image (HDR_PRED) is performed in a manner which constrains the multiplying to a multiplying strategy in which a local average luminance of the output image (HDR_FIN) is within a predetermined percentual deviation from a local average luminance of the intermediate image (HDR_PRED). This can be done in various ways by introducing average luminances or similar values into the equations of the multiplicative modification strategy.

A method of decoding an image encoding, in which a type value 508 is read, indicating that the multiplication factors are defined in relation to such a constrained multiplying. Several types of multiplication strategy can be so encoded, of which we describe two interesting ones for elucidation.

A method of decoding an image encoding in which the multiplication factors are read from the metadata as a functional definition of multiplication factors over a running 1-dimensional or 2-dimensional position coordinate. One may also encode multiplication factors, especially if they follow a regular shape, and given that in general they may not need to be very precise, as a functional form. E.g. factors 1, 4, 9 or 1, 5, 8 could be encoded as a square function over the successive positions. In general the numerical coding of the multiplication factors will be preferred though.

A method of encoding an original image (HDR_ORIG) of a high dynamic range scene as an image encoding (LDR_CONT) corresponding to a first luminance dynamic range (R_oLDR) the method comprising:

tone mapping with a predetermined tone mapping strategy (FL2H) at least the lumas of pixels in the image encoding (LDR_CONT) onto lumas of pixels in an intermediate image (HDR_PRED, GRAD_1LDR) corresponding to a second luminance dynamic range (R_oHDR);

determining multiplication factors for multiplying with the lumas of at least some of the pixels of the intermediate image (HDR_PRED, GRAD_1LDR), by analyzing the difference of pixel colors in the intermediate image (HDR_PRED, GRAD_1LDR) with those of a specified second image (HDR_ORIG, or GRAD_FIN-LDR); and encoding in an image signal (S_im) the image encoding (LDR_CONT), data specifying the tone mapping strategy (FL2H) and the multiplication factors.

This could encode e.g. modifications of a lower dynamic range prediction, in case the HDR signal S_im predominantly taylors for a HDR display system. In that scenario, the system can derive LDR images for connected LDR displays by downmapping the luminaces of the 8 bit usable as a HDR driving image 8 bit_HDR (or whatever HDR encoding, e.g. 10 bit with some defining tone mapping function compared to linear luminance HDR representation). But typically the encoder may of course encode an LDR_CONT which is simply usable on legacy LDR systems, in which case a HDR image is predicted as intermediate, and the multiplication factors serve to modify it to come closer to the HDR_ORIG. I.e. this would correspond to a method of encoding an original image (HDR_ORIG) of a high dynamic range scene, in which the first luminance dynamic range (R_oLDR) is a low dynamic range, which typically corresponds to a peak brightness of the range of 500 nit or lower, and the second luminance dynamic range (R_oHDR) is a high dynamic range, having a peak brightness of at least 750 nit.

A HDR image decoding apparatus (401) comprising:
a decoder (402) arranged to obtain an image encoding (LDR_CONT) corresponding to a first luminance dynamic range (R_oLDR);
a tone mapper (403) arranged to obtain a specification of a tone mapping strategy (FL2H), and to apply the tone mapping strategy to the image encoding (LDR_CONT) yielding an intermediate image (HDR_PRED) corresponding to a second luminance dynamic range (R_oHDR); and
a pixel color modifier (404) arranged to obtain multiplication factor data (A_MUL) comprising at least one multiplication factor, and arranged to multiply the at least one multiplication factor with the luma of at least one pixel in the intermediate image (HDR_PRED), yielding as output an output image (HDR_FIN).

A HDR image encoding apparatus (701) comprising:
an input for obtaining an original encoding (HDR_ORIG) of a high dynamic range scene,
a grading manager (702) arranged to convert that original encoding (HDR_ORIG) into an image encoding (LDR_ CONT) corresponding to a first luminance dynamic range (R_oLDR), and arranged to determine an intermediate image (HDR_PRED) corresponding to a second luminance dynamic range (R_oHDR) by tone mapping the image encoding (LDR_CONT) with a tone mapping strategy encoded in tone mapping data (FL2H);
a grading difference comparator (704) arranged to compare the intermediate image (HDR_PRED) with a specified second image (HDR_ORIG, or GRAD_FIN-LDR), and to derive on the basis of a difference between these images multiplication factor data (A_MUL) comprising at least one multiplicative factor which when multiplied with the luma of at least one pixel of the intermediate image (HDR_PRED) yields a final pixel color of an output image (HDR_FIN) which is closer to the color of a corresponding pixel in the second image than the color of the pixel in the intermediate image (HDR_PRED); and
an encoding unit (710) arranged to encode the image encoding (LDR_CONT), the tone mapping data (FL2H) and the multiplication factor data (A_MUL) in an output image signal (S_im).

A HDR image encoding apparatus (701) will typically further comprise a user interface unit (703) arranged to allow a human color grader to determine at least the image encoding (LDR_CONT), and the tone mapping strategy.

The skilled person will realize that the components of the invention can be further embodied in many ways, such as software, or an HDR image signal comprising:
An image encoding (LDR_CONT) corresponding to a first luminance dynamic range (R_oLDR);
tone mapping data (FL2H) to be used for tone mapping the image encoding (LDR_CONT) into an intermediate image (HDR_PRED) corresponding to a second luminance dynamic range (R_oHDR); and
multiplication factor data (A_MUL), comprising at least one multiplication factor to be used for multiplying with the luma of at least one pixel in the intermediate image (HDR_PRED).

Or a portable data device arranged to be able to store data, such as e.g. a blu-ray disk, comprising such an HDR image signal.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings:

FIG. 1 schematically illustrates an HDR scene;

FIG. 2A schematically illustrates object luminances in the HDR scene, and

FIG. 2B schematically shows how such object luminances can be codified with one possible LDR luma encoding, and namely a histogram of such luma values in an LDR image;

FIGS. 6A, 6B, 6C, and 6D schematically illustrates in a gamut view how one example of applying the multiplicative modifications after the optimized mapping between and encoding for a first and second luminance dynamic range would work in case a HDR_encoded_as_LDR encoding technology is used;

FIG. 7 schematically illustrates what a possible realization of a HDR image encoding apparatus according to the present principles can look like.

DETAILED DESCRIPTION OF THE DRAWINGS

Figure 3A:
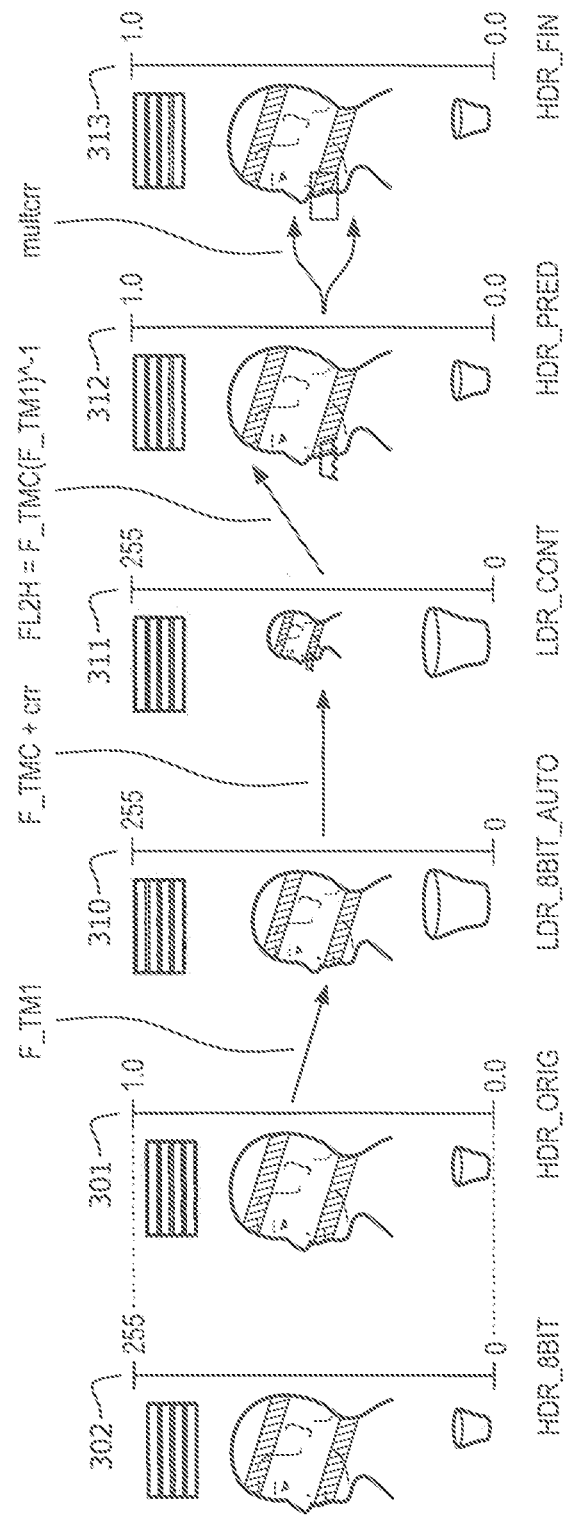
FIG. 3A schematically illustrates a mapping chain between different representations of an image of the HDR scene.

FIG. 1 schematically shows a typical example how a content creator can design an HDR scene (whether for any photo application, a movie, on-the-spot news gathering, computer graphics generated, etc.). There is typically an averagely lit interior with objects like table 105, which lumas encoding the luminances will oftentimes fall somewhere near the middle of the code range of an encoding (e.g. luma 128 and around). There is at least one region of considerably higher luminance, namely in this case a sunlit outside world 103 as seen through the shades (bars 102) of a window 101. Because of the shades, the room can be considerably darker. Out there, there are bright objects like house 104, which normally should end up as encoded with lumas high up on the code range. Inside there may be very dark objects in shadow regions, like basket 120. There are also regions which are critical as to their colour rendering, on an HDR as well as on an LDR display. In this example it is a person 110. In contrast to LDR scenes for LDR imaging, in which one usually optimizes the illumination to have some light structure on the face, but not of too much contrast (e.g. 3:1) in this lighting scenario there may be bright sunlit bands 112 on the face, as well as dark shadow bands 111.

FIG. 2A shows how the scene looks colorimetrically from a luminance histogram point of view (n is the number of pixels with a luminance L_sc), and how it can be captured by a camera which for simplicity of explanation we will assume to be linear across the range. In fact we may consider instead of the actual scene, already a captured and typically HDR graded original or master HDR image, which contains the scene luminances now codified as representative luminances L_sc (e.g. in an XYZ color representation) for corresponding pixels (we pragmatically end at 50000 nit, which is where the 1 billion nit sun will clip to). The outside worlds object luminances are summarized by lobe 203. The basket corresponds to lobe 204. The dark and bright bands on the face correspond to lobes 201 and 202 respectively. A classical LDR camera capturing would typically take a subrange R Grab LDR-Class, and map these luminances to lumas within [0,255], typically with a gamma function Y_LDR=a+b*L_sc^gamma. All luminances in the range R_Above will be clipped to 255. In the exemplary embodiment elucidating our invention, we will need to encode all values in the HDR range Range_HDR, since we need to be able to almost identically reconstruct an HDR representation (i.e. close to the master HDR representation) from our 8 bit encoding Y_LDR_aut. This will involve intelligently shifting and compressing the various lobes. In the example of FIG. 2B we have allocated a narrow range 284 of codes for the dark objects, e.g. only Y_LDR_aut={0, 1, 2, 3, 4, 5} are possible, since we expect we needn't have too high visual reproduction quality for these dark regions under the intended viewing conditions. We have allocated a considerable subrange for the bright object's lobe 283, since we need enough code values to codify sufficient information for all the textures in the sunlit outside environment, like the details in the bricks of the house 104 (which shouldn't become banded, or show exaggerated DCT compression artefacts, etc.). The face regions now correspond to luma code lobes 281 and 282. We have assumed that the upper luma limit Y1 of the lower lobe is still somewhat separated from the lower limit Y2 of the brightly illuminated face higher lobe 282. This is a balancing choice. From a coding point of view, to recover the HDR picture, we could of course just as well have the code lobes being touching. We would then need a somewhat more stretching tone mapping to project those to their required HDR predicted picture ranges. But remember we also need to have a well looking LDR image, when this Y_LDR_aut encoding is send directly through an LDR decoding and rendering chain (in which case those lumas are typically converted to output display luminances via a gamma 2.2 mapping). I.e. we may need this distance to make the face look sufficiently contrasty to have somewhat of this HDR scene illumination even rendered on a limited LDR display. But on the other hand this intra-object contrast should also not be too high, be it already only for the fact that an LDR range doesn't accommodate so many code values (since we still need enough code values above for the sunny outdoors, for which we have assumed that the most reasonable rendering given constraints is to make them start at Y4 without further lost codes, given that accurate HDR rendering is not possible there anymore anyway). One should also note that also the chromatic coordinates of the pixel colors are involved, via the non-linearities of such aspects like the two gamuts of the HDR and LDR dynamic range. Anyway, if one maps/encodes this face non-optimally, one may see e.g. something which looks like a chocolate icecream man, in case the bright parts have a vanilla kind of look, and the darker brownish parts, a kind of chocolate look. In such a case, the grader should definitely continue his grading to obtain something better in some way, i.e. the LDR grade and its corresponding mapping or in general transformation should become better, ideally not modifying the recoverable HDR too much either (which in principle should be (near) fully reversible, making the master HDR exactly recoverable).

FIG. 3A shows a possible processing chain showing encoding in an HDR_encoded_as_LDR technology embodiment, and the generation thereof of an HDR image suitable for driving a particular HDR display. We start with the master graded HDR image HDR_ORIG which is assumed to be encoded along a float precision range 301 between codes 0.0 and 1.0 (or actually e.g. 1.00000000). The positions and sizes of the scene objects schematically illustrate which subranges the scene objects would cover on a display rendering corresponding to an encoding. For HDR_ORIG we assume a linear luminance space. The window (or at least the bright outside) will lie somewhere at the highest luminances the HDR display can produce, perhaps not at the peak brightness, but close, so that there is an appearance of a real sun shining. The basket is very small, because it is mapped to the lowest percentages of peak brightness, which for 3500 nit will still result in good visibility for those dark textures. The face was graded so that it really had a very contrasted HDR lighted look, i.e. it will span a considerable subrange from very bright to relatively dark. This may have an acceptable look on that 3500 HDR display (which may have been the one used by the grader when creating the master grade), but it may result in an objectionable look on other displays. Now as shown towards the left, one could always directly quantize these floats into an 8 bit representation (HDR_8 bit with range 302, which then of course corresponds to the same luminance range as 301, but has a code range depending on the mapping function). But in this direct application technique (which assumes a linear display, or at least a calibration in the rest of the chain which behaves as 1-to-1 linear direct accurate colorimetric reproduction of e.g. an XYZ image), there is actually no mapping needed which shifts the object's brightnesses along the range, but rather a mere rounding to binary numbers.

Figure 3B:
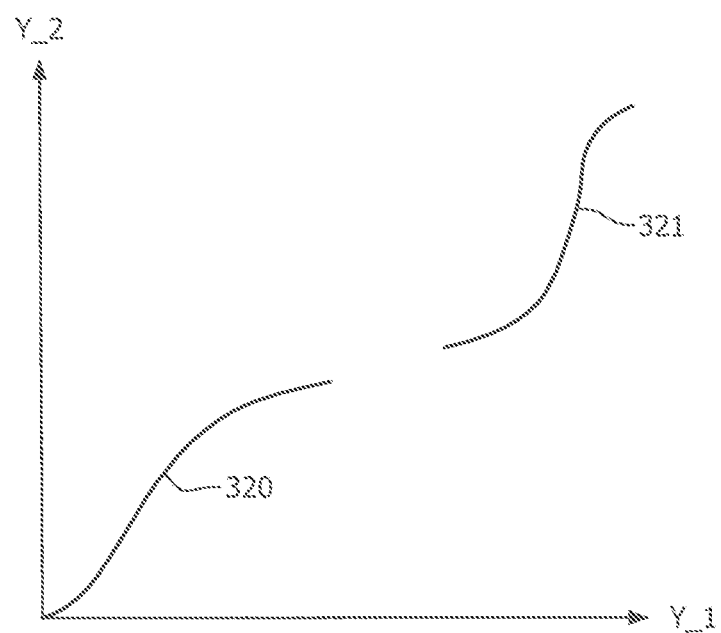
FIG. 3B shows an example of a global tone mapping function which can be used to map between two such different representations.

Towards the right we show a possible way to come to an HDR_encoded_as_LDR encoding. Since we need to have a reasonably looking LDR rendering, we need to apply a tone mapping F_TM1 which shifts the brightnesses of object pixels. E.g., one may need to stretch the rendered display output luminances of the dark basket so that it becomes better visible, which it does by allocating it to more low luma values (schematically illustrated by the bigger basket over a larger subrange of the first LDR prediction). The window is pastellized to less LDR lumas, at the highest end of the LDR range. And one may need to reduce the contrast of the face, so that one still sees somewhat darker shadow bands, but these are on average e.g. only 2× darker than the bright bands. This first tone mapping may be done to LDR representation LDR_8BIT_AUTO e.g. by an automatic algorithm looking at all the (regional object) statistics of the image, and then determining a mapping function taking into account on the one hand a penalty of reducing the number of code values for object sublobes (e.g. those histograms could be further analyzed, and a couple of values may be needed around maxima, and in between those histogram maxima, the number of codes may be determined based e.g. on integral values calculated from spatial gradient measures, or texture measures, like complexity measures and parameters quantifying shape deformation under quantization, etc.), versus a mathematical process for evaluating a penalty for modifications in semiglobal contrasts (e.g. averaging over a certain size and determining varying illumination measures etc.). This may give reasonable results for many shots, in particular where the actual colorimetrical look is less critical (e.g. a dark forest where one need not see too much, with lantern poles in front of it, which light shapes may easily be quantized to a single value, of whatever luminance as long as it is high). But in other shots the human grader finally responsible for the LDR grade and HDR/LDR encoding (e.g. for storing on a blu-ray disk) may be not satisfied. In that case he may finetune the picture global tone mapping to arrive at a different grading and look on an LDR display. Thereto he applies modifications to the mapping functions, which need to be reversible to recover an HDR prediction. An example of such a tone mapping which consists of two partial functions 320 and 321 is shown in FIG. 3B The skilled person understands how one can construct such functions between any first luminance codification Y_1 (e.g. a gamma 0.45 defined luma Y=L^0.45) and any second codification Y_2, whether they are digital or float, whether defined as mathematical functions or lookup tables, etc. Let's assume in the example Y_1 is the float coding of HDR_ORIG and Y_2 the LDR_8BIT_AUTO coding. In case the face is residing in the 321 portion, he may consider e.g. to lower the slope of that part (still keeping it monotonously reversible). This may have an impact also on the lower mapping 320 if we need to recover more code values. In FIG. 3A we have assumed that the grader modifies an 8 bit LDR_8BIT_AUTO encoding to his preferred encoding LDR_CONT having the best look on his local representative LDR display. But of course for better precision he will typically apply a mapping on the high precision float. Ideally, he will be able to solve the problem by accurately tuning the picture global mapping function, which will be a final function resulting from what the automatic algorithm prescribed, and how it was manually finetuned. But there may be several reasons why the grader decides he cannot or will not come to such a function (e.g. because when tweaking the face he is deleteriously changing yet other colors in the image, or other images if he intends to use the mapping on a shot of successive images). In that case he may apply more complex colorimetric modifications, e.g. local operations to the face. We have symbolically shown by him changing some of the pixels in the LDR_8BIT_AUTO to yield a final LDR_CONT in which a moustache has been drawn. Of course the original content creator will not usually let him do such radical things to his content, but it is to illustrate that some operations can be done which are not simply obeying the simple reversible chain HDR_ORIG->LDR_CONT->HDR_PRED (shown with the operation crr). The grader may be allowed e.g. to do a spatial sharpening operation on some object in the dark to make it a little better perceptible, or that may be his solution to fill the both requirements of good quality LDR rendering and perfect quality HDR rendering. With simple reversible picture global tone mappings, one could by applying the inverse tone mapping FL2H of all what was in the end mapped to arrive from HDR_ORIG to LDR_CONT, and obtain as predicted HDR signal HDR_PRED exactly the same signal as HDR_ORIG. At least up to precision (and (DCT) video compression) errors. But, the argumentation is that usually the predominant quality factor of HDR rendering is that all objects lie at (approximately) the right luminance level, and that some minor artifacts are less critical.

Anyway, now according to the present invention, whether the error was due to some rounding (or even clipping) in the LDR_CONT, or some non-reversible modification like the moustache, it will be corrected by applying a multiplicative correction multcrr to at least some pixels of HDR_PRED, i.e. typically those few where it goes wrong at least is considered to be unacceptable (typically a very critical object in only a few shots of the movie), resulting in a final high quality HDR image HDR_FIN.

It is interesting to see how our invention as e.g. applied on an exemplary HDR_encoded_as_LDR (or in other words LDR container encoding of a HDR representation) works from a gamut point of view. One should then realize that an encoding corresponds to some reference display, which need not necessarily have the same characteristics as the display the image will actually be shown on. We will clarify this since not everyone in each parallel color technology thinks the same way about this. Of course an RGB encoding only has some definite meaning if we know which R, G and B primaries were chosen (e.g. the EBU primaries of old CRTs, or the paler blue of some LCD). But there are more characteristics which are potentially relevant for the ultimate meaning of a color encoding (e.g. peak brightness of the white, an encoding mapping function between luma and luminance (and this still can be for many different reasons), aspects relating to an adaptation state of a viewer such as parameters defining a surround, etc. (and sometimes particular display characteristics are taken separate and introduced already in the encoding)). But not everybody considers all these factors equally relevant for every application scenario, e.g. some may consider the chromaticity of the display white important but not necessarily the peak brightness, assuming this has lesser relevance (or oftentimes ignoring its relevance, assuming the colors can be reasonably rendered in a relative colorimetric way). E.g., for printing, one can only make a single optimal print, with the paper white only giving a relative maximal luminance (100%). The real luminances (physical quantity) and brightnesses (psychovisual quantity) of the colors in the print will however depend on whether one watches it outside in the sun, in a dim indoors, or even in a dark evening environment. And this will have an impact i.a. on the colorfulness of those printed image objects. FIG. 6A shows a typical gamut of an additive color reproduction system of a kind like a 3-primary CRT display (based upon which classical television color encodings like for MPEG standards are defined). Most people are acquainted with the RGB color cube in linear RGB or XYZ color space, but this is what the display gamut corresponding to such a display, or the encoding fully and linearly driving it looks like. This tent-shape occurs if one draws as its base a color triangle in some color plane like (x,y), and takes as a "Z-axis" the linear luminance L_o. In case one uses a luma Y which is a power function (like gamma 2.2.) or a similar (relatively simple) function, one gets another tent, which is deformed somewhat (typically the lower parts will be stretched, and the higher parts compressed, but since the gamma or luma encoding in fact normally operates per channel the compression occurs somewhat everywhere (because it's a schematic drawing, we haven't skewed the tent for each particular choice of luma encoding function, since the principles are similar, as it is still a tent with straight poles for each primary, and nonlinear behavior between that, giving the tent canvas which culminates at the white of the display or encoding, where one can imagine the grey or achromatic colors axis as a tentpole). In between there are colors like yellow (J), which has a luminance somewhat below that of the white (and a color encoding of [1, 1, 0] in luma/gamma-mapped codes). FIG. 6B shows the view from an encoding technology perspective. One just has two 8 bit codes (which the same tent shape), only, the image objects (and in particular their grey values, which we will call luminances or in fact lumas if we're talking about the encoding, i.e. we then use a terminology similar to YCrCb coding, in which the Y is the achromatic luma, and the CrCb are channels containing mainly chromatic information) are encoded differently in them. This is illustrated by the different size and position of some objects. This may seem strange at first if one were to look at the encoding as a representation of a captured scene (e.g. coming out of a camera), but it makes more sense if one considers the representation to be display-oriented, i.e. to be used for display driving with an optimal allocation of the image object colors for a particular display (whether directly driven, with minimal or extensive own color processing for optimal output image rendering). E.g., it may be typical to reserve a larger area of the code space (i.e. its related gamut) for bright objects (symbolized by the sun, but in reality it may be an object with a complicated texture with varying reflectance percentages) in the HDR encoding, since a brighter display has many colors it can render brightly (and the LDR display has few, or none). Therefore, the LDR encoding may reserve fewer colors for those bright objects. In fact, if it were just an LDR encoding, those colors might be severely (soft)clipped, such as what happens currently in several television programs. However, for our purpose, note that sufficient details should be retained for reverse mapping from the LDR container encoding (8bLDR in FIG. 6B to the predicted HDR (8bHDR). Typically the main regions, with luminances around 18% grey in an LDR range, will be well represented with a major area of the code gamut, as shown with the face. Dark objects may be allocated to more and/or higher codes in the LDR container encoding, to make them better visible on darker displays (hereby giving more weight to criteria regarding the visual quality of LDR displaying). We understand that changing the sizes of code ranges (on the luma axis, as we will not elaborate on the color directions here), means they can bump into each other, and take away some of the range of the other objects for the benefit of the code-stretched objects (not necessarily color/luminance stretched, as that will also depend on the final gamut mapping and display characteristics). Therefore it may be safe to allocate minimum ranges, e.g. a medium range MSR may be selected between a lower Yl and upper Yu luma, which contains a mimimum amount of codes desirable for the main (well-illuminated) objects in the image, and complementary to that one can define a high range HSR for the light effects (and oftentimes also a low range LSR for special handling of darker regions in the image).

FIG. 6C shows what a gamut mapping typically looks like (we have now for simplicity shown only a cross-section through one hue, showing a plane of luminance and saturation) in case we want to map from a first gamut (GAM_1) which is capable of rendering at least in some region(s) of color space some colors (e.g. of higher purity/saturation) which may not be rendered on the other/display gamut GAM_DIS. In such technologies usually one fixes the white of both gamuts at the same point (assuming there is no difference in white point color temperature for simplicity).

The optimization task is then to allocate the out-of gamut input colors (like color Col_in) to output colors within the display gamut (or vice versa for the other way around), with a minimal visual color deviation from the original color. Typically some compressed allocation profile will be used to move the extent of colors beyond the display gamut boundary to a region adjacent to and within the display gamut boundary, since one still would like to be able to see some difference between colors (although there may be some physical or visible quantization to equal values involved). There are several gamut mapping variants, which trade-off different kinds of color error. E.g., for regions of GAM_1 which fall above the GAM_DIS (in particular with a boundary-parallel-shaped subregion of GAM_1), one may use a projection towards the luminance axis which also goes to lower luminances L_o, e.g. towards a selected grey level on the luminance axis.

In our LDR container LDR_CONT encoding, we have a number of different considerations, as illustrated with FIG. 6D. Firstly, note that, although one may of course also define the LDR_CONT encoding with different primary chromaticities than any HDR encoding (in this case an 8 bit HDR prediction), this is not necessary, so we have assumed those primaries are the same, which means both reference display gamuts corresponding with the encodings have the same gamut base part. We illustrate here (in luminance representation) a HDR gamut which corresponds to a display with double peak brightness, and double maximal luminances for the primary signals. This is physically realizable with e.g. a LED display with a white 2D LED backlight, in which the LEDs are dimmable, and when fully boosted give a double luminance (e.g. 1000 nit) to the same LCD panel as the LDR, which reaches a reference peak brightness with e.g. TL backlighting (e.g. 500 nit). For simplicity of explanation, we ignore all issues like e.g. losses, non-uniformity of backlighting, reduced driving for power consumption etc., since these all correspond to modifications on a principle which is tangential to the teachings of this invention and its embodiments and variants. Normally the display will take care of all this in his final mapping of our encoding to its physical driving signals. Because some of the luminances regions in which the LDR renders the objects in its outputted image overlap with which luminance the HDR display uses to render, we have shown the HDR rendering in dotted versions of the objects.

We see that in our applications, we are predominantly concerned with how systems behave along a luminance (and corresponding luma(s)) axis. This is why we describe the approach in an absolute luminance comparison of the gamuts. We will optimize all our encoding components (e.g. the tools a grader uses) taking the luminance or brightness/lightness appearance into consideration, and comprehensively characterize all factors related to this. The dark basket is rendered almost the same on both displays, but in the HDR variant it is somewhat darker, since we assume an HDR encoding will be used in rendering scenarios were, although it may still be under comparable surround illumination, the HDR rendering will possibly be able to render somewhat darker objects than an LDR rendering system. The lumas corresponding to the required luminances for the basket pixels may be almost anything given the variability of the mappings a grader can use to define his LDR container image (which will then become the encoding defining mappings), and in fact also how the HDR_PRED image is to be interpreted. In general we do assume that the order between luminances will be retained in a luma encoding, so also in a mapping to and from our LDR_CONT. But that doesn't even imply that because the LDR basket spans more luminance values, that it should also span more luma values than in a HDR encoding. It may span a smaller luma code range in the 8 bit LDR_CONT than in e.g. the 8 bit HDR_PRED. In that case the HDR_PRED basket may have some missing or interpolated codes. But in general, because we expect a direct application via a 2.2 gamma to the LDR display, we may consume some more luma codes in the LDR_CONT encoding than in an HDR encoding.

The middle region objects like well-lit faces will typically be encoded somewhere around the middle range of the LDR gamut (code 128, or 18% gray, or a stop above). In the HDR display we may desire to render it with similar luminances, so that they still look like normally lit objects. But we may make a little use of the higher luminance range of the HDR display, by dividing it into some brightening up of the main objects, and reserving some subranges for bright objects. This is already another difference with classical gamut mapping. We may not want to optimize the mapping according to visual similarity, and not alone based on issues such as a similar look of an LDR rendering. On the contrary we may want to tune away our mappings from those solutions by designing the HDR look in a particular way. That is even more clearly understandable with some brighter objects. There we cannot give a similar look to the objects in the LDR rendering so encoding as in the HDR rendering/encoding, like in the technical reasoning behind FIG. 6C. Even stronger, HDR is oftentimes about a region of display technology where physical luminance descriptions should preferably be supplemented with psychovisual descriptions (although for the driving and encoding technology luminance and luma of course suffice, and the psychovisual dimension is if not by smart automatic algorithms, usually handled by the human grader). E.g., there is a certain display luminance above which lamps really seem to become lamps in HDR rendering, and not whitish reflecting objects as in LDR (which are at best construed in the brain as bright lamp objects in the brain because of semantic recognition, but that just isn't the same perception nor sensation wise). And apart from LDR gamut limitations, and preferred LDR look issues (the grader may desire to make the LDR look considerably different for some reason), we of course have the additional factor of reversible mapping towards HDR_PRED, which gives further optimization constraints based on information-encoding considerations, such as how many codes should be allocated to a particular object or luminance/color range of the HDR display in the LDR_CONT encoding.

The incandescent lamp symbolizes such an object of considerably higher (HDR) brightness, and some brightness variations given its object texture upon rendering. Given all constraints we want to encode this on a subrange of LDR_CONT which is close to the main range containing the face. It may not give the same appearance on an LDR monitor, but that is normally not possible anyway, and at least it is now encoded in a way it still gives a good or reasonable appearance even in LDR. E.g. in combination with well-chosen surrounding pixel colors which lead to a final brain determination of the color, such as rays emanating around it etc., it may still look sufficiently lamp-ish in LDR. In the HDR display gamut, we have considerable freedom to place such various bright objects well above the luminance range of the main objects like the face, giving an impressive HDR appearance. And of course corresponding to those luminances are the lumas of HDR_PRED (whether it is an 8 bit encoding, or preferably a float [0,1] encoding of which we will for simplicity assume it is linear i.e. has a linear definition for the allocation of its codes compared to the display rendering output luminances, such as in an intermediate representation of an image processing IC).

Above this bright object luminance range, there may be even brighter objects, here symbolized by the sun, about which we assume it is not rendered with a single color. Now given all the preferred renderings of the lower luma objects in the LDR_CONT on an LDR display (stretching the basket and face region upwards), it may happen that at least some objects like the sun have to be crammed in the tip of the gamut. In that case the reverse mapping will still place the sun at the brightest region of the HDR display gamut, but due to the lesser quality of the coding in the LDR_CONT, the reverse mapping may not yield the luminances/colors we would like to see in the HDR rendering. That is where our multiplicative modifications multcrr can come in handy to create a better encoding in the HDR encoding of that sun, more corresponding to the desired HDR rendering, in particular as it was encoded in the master HDR encoding.

Figure 5:
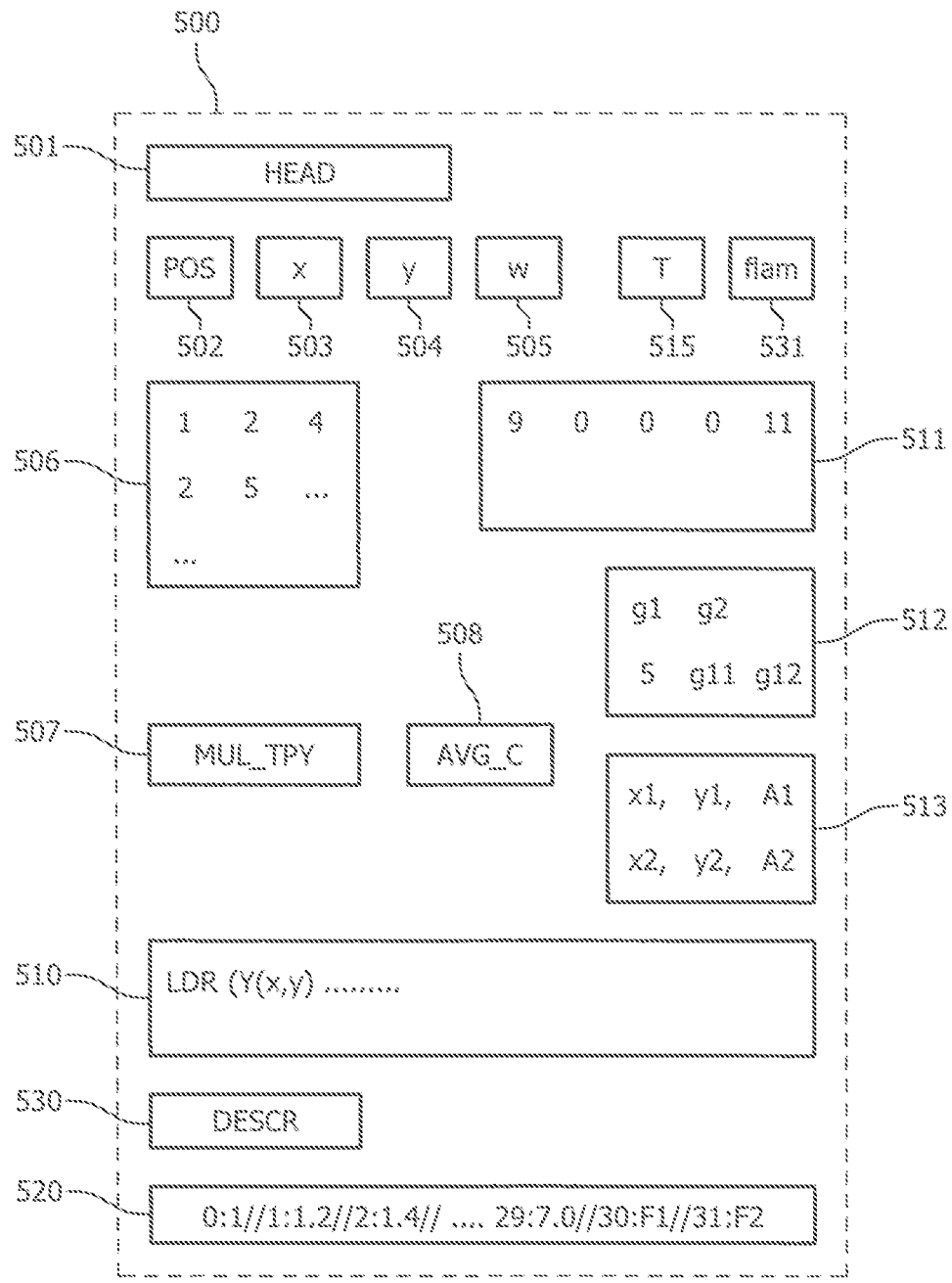
FIG. 5 schematically illustrates how one could encode in some embodiments of an image signal some of the data needed for some embodiment realizations, the skilled person understanding that some of this data may be alternative, additional, optional, etc.

Two useful embodiments of possible multiplicative modifications are schematically shown in FIG. 5, which schematically shows an image signal 500 shown as composed of data units, as they may typically arrive in succession during streaming, or be stored in different spatial segments of a memory. Typically after e.g. an image header 501, or even an indicator of a start of a shot or temporal run of successive images to be treated similarly as to their colorimetric remappings, there will be metadata for modifying some part of an image. A reserved codeword 502 (e.g. POS) gives information on where to apply the multiplicative modifications, and then there are region definition parameters like the start x,y of a rectangle, and its width (w in reserved code word 505), since then one can decode the string of multiplication factors in multipliers table 506. There may be other codings, e.g. luma thresholds allowing more precise object boundary determinations like in application U.S. 61/615,409, but some may prefer the rectangle approach and define the shape of correction in the multiplicative factors. A rectangle may be specified by starting coordinates 503 and 504 and a width 505 (i.e. a reserved position containing some width encoding code word), which may e.g. be encoded behind an image header 501 of the present image. There may also be a time code 515 indicating in which image of the shot the signal is supposed to be applied (although that is not mandatory since the spatial code may already be behind a particular image header), and of course there may be several of those specifications allowing tracking and deformation of objects. The skilled person should understand there may be alternative codings like with threshold lumas g allowing objects to be pixel-accurately segmented, though in general simple/robust codifications may be preferred if not much data need be encoded anyway, or no other special requirements exist. Of course, e.g. for contrast stretching, one may also give multiplication factors for spatial collections of pixels, e.g. one for the left part of the object, and another for the right part (or e.g. the dark and bright bands of our face), etc.

Interestingly, the image signal typically also contains a type indicator 507 of the multiplicative correction, identified in the signal by reserved word MUL_TPY or similar, and its value which will be able to have at least two values.

E.g., the type value 508 can be "M_NORM" (or another codification like "1"), in which case the multiplications are just directly applied to the underlying pixel lumas. This can be used to write structure in e.g. a lamp which was clipped to 255, and e.g. 1018 after mapping to HDR. The successive lumas 1018, 1018, 1018 will then be multiplied with whatever typically pixel local factor is encoded in the metadata (e.g. ×1.2, ×1.4, etc.). To save on bits, it is best if the multiplication factors are not encoded directly, but rather with identification codes via a definition table 520, which may be stored in other metadata, e.g. at regular intervals in the stream, or a reserved sector on a disk. This is because one needn't have the highest recovery precision since it is already better if one can improve the image somewhat compared to the prediction which may have a serious deterioration of some HDR effects or other quality issues, and because of such factors as noise inherent in images, the complexity of the image and its objects, and the sensitivity of human vision. Typically the human grader will determine if and to what extent a correction should be done, an although typically he will have predetermined identification code to multiplication factor definition tables (520), he may finetune or determine one himself, e.g. adding more precise multiplication factors in between the predetermined ones, should that give a significantly better improvement, and then codify them into the system (instead of pre-agreed ones, which might not be encoded in the metadata, but may have been anyway since not too much data is involved). Typically embodiments of such tables may have one code which signifies that nothing is done, i.e. multiplication by 1 (equivalently), for which one typically may reserve the identification code value 0. We have given an example of a two dimensional window of multiplication factors (table 506) which have e.g. 6 bit code words, given 32 possible optimized values. The most interesting multiplication factors depend of course on whether we use them to offset a color (M_NORM), or to stretch object contrast ("AVG_C"). In the example a 1 indicates that the luma should be multiplied by 1.2, a 2 indicates 1.4, etc., and some of the codes may have downwards, i.e. dividing, values like 0.9. Note that there may also be a couple of codes reserved for other operations, like a functional formula taking as input some of the multiplied results of spatial neighbouring pixels, value 30 indicating that a first such function or algorithm F1 should be used. E.g. it may be that some pixels suffer from compression artefacts, and rather than to cure them with a multiplication, they could be skipped and interpolated from their processed neighbours. Finally segment 510 just contains as classically the data for e.g. 8 bit image encoding, e.g. according to any MPEG or JPEG standard prescription or similar.

Another kind of multiplication AVG_C is one which doesn't or hardly does change the local average, but does change the texture profile around this. This is useful e.g. in case there is relatively severe quantization and/or a small slope in a part of the tone mapping curve for the local grey values. Although encoding codes codifying a precise functional shape may result in additional values, already a great improvement to the visual quality such as sharpness, contrast etc. may be achieved by further modifying in particular ways those values that were encoded in the LDR_CONT. One may typically boost compared to a running average, or if the individual boost values don't change too much, one could even use the first luma of the first pixel of the run of pixels as representative value (but the average is more correct).

One can then write the lumas of the run of pixels as $A+dl1, A+dl2, A+dl3$, etc, A being a local average over some region. One will then boost the dl's only, i.e. multiply $Li-A$ by the respective successive multiplication coefficients $mi$, $Li$ being the luma per running pixel i of the HDR prediction obtained from mapping the HDR_encoded_as_LDR representation LDR_CONT. And then one adds the average value to obtain contrast-increased (or decreased) lumas, i.e. giving running output lumas $Lo\_i = A + mi*(Li-A)$.

(Filter-based defined) averaging encoding data structure 511 gives a first embodiment example on how averages for the above invention can be encoded (of course, one may also have them calculated in a fixed way, e.g. always over 11 pixels, taking into account inappropriate values across a strong border to be discounted from the averaging, so that no further information needs to be encoded). The 9 indicates that for this pixel a window of 9 pixels should be used to determine the local average along that line, i.e. the pixel luma itself is added to the lumas of 4 pixels before and after. The zeroes indicate that the previously calculated average is used for the multiplicative modification of these pixel lumas. The 11 indicates that for that pixel an averaging window of 11 pixels around the local pixel position should be used. Of course the skilled person realizes that this could also be encoded with other data structures, like e.g. run length encoding of the zeroes etc.

(Segmentation-based defined) averaging encoding data structure 512 gives another way to specify how averages can be calculated, by means of thresholds. E.g. on the present line, averaging is done until the value g2 is encountered, which typically indicates we have moved over a luma edge to a next object. Luma values along the averaging window below g1 (there could be a similar threshold for discounting values above it) will be discounted, because they are e.g. noise spikes. The 5 on the second line indicates that this scheme is used for 5 consecutive lines, and then new luma thresholds g11 and g12 for steering the averaging process are used. But it should be noted that determining the correct average is not very critical. As long as one boosts the structure without introducing artefacts such as inappropriate brightness modulations due to incorrect adjacent averages the method will work. The grader has the option to either modify the multiplicative parameters, which also have an effect on the final look, or to choose a more precise encoding, e.g. to modify how a local average is calculated. A third alternative or auxiliary local average encoding data structure can directly encode the values of averages to use for particular positions and beyond or around those positions. E.g. the average A1=450 would be used between position x1,y1 and x2,y2 in the window in which multiplicative modification is performed. In an auxiliary manner this encoding could be designed as an algorithm which prefers the encoding data in (direct positional average defined) averaging encoding data structure 513 over that in 511, e.g. at the position of the 11, instead of calculating over such a window, it will just use the final average value encoded for that position in 513, e.g. A2. In the user interface for the grader, these multiplicative modification parameter values will largely be calculated automatically from differences between the HDR prediction given the preferred LDR container grade of the grader and the original HDR. Of course, such will be steered by specific actions of the grader, like selecting a window to be treated differently, e.g. higher quality encoding, or particular grading actions or modes, e.g. on a face. But of course the interface also allows the grader to more directly specify or modify the various multiplicative correction parameters, e.g. in a coarse easily accessible manner. E.g., in case he sees an annoying brightness modification, e.g. a spatial modulation, he may select that region and e.g. slightly darken it, which makes the module in AVG_C mode redefine its averages so that they become darker, e.g. by directly encoding them in data structure 513.

A very important part of the encoding is how the multiplicative factors are encoded. In case one wants to correct a region which has been graded in a very specific way in the LDR container (read, so that it cannot be reversibly predict into a very close approximation of the original HDR given the present e.g. simple tone mapping, which may be a particular function of LUT), one could just replace it by some straightforward encoding of the required local HDR signal. E.g., the grader may have recolored the face in the LDR container, to obtain totally new pixels, which would result in a different face in the HDR prediction versus the original HDR. One could then simply co-encode e.g. those local parts of the image (containing the face), e.g. by storing the original LDR container pixel colors (i.e. the first grading from the original HDR to an 8 bit LDR, with simple, easily reversible global tone mappings) in a partial second image. But according to the present invention, it is favourable just to store multiplicative values, which quickly approximate that original image.

E.g., in case the original HDR contained locally the values 450, 482, 390, 520, and the HDR prediction gives for these pixels 440, 470, 350, 500, then one could easily obtain multiplicative factors by dividing them, yielding: 1.023, 1.026, 1.114, 1.04. But one need not directly encode these multiplication factors. E.g. if all local factors were to change by 1.02 and then a variable last digit, one could encode the last digit via an index, e.g. that digit itself. So e.g. 3 would then mean multiply by 1.023 instead of 3. So one can locally optimize, and define an optimal table. But there are more interesting optimizations of the table we can do for HDR encoding, since the predicted value need not be exact anyway, i.e. could be 453 and 485 etc. instead of 450, 482, and still give good visual quality in a complex dynamic movie. Making an error of 3 on the 450 would be better than a larger error, e.g. 10, anyway, especially if the large error is so largely that it is easily or even annoyingly visible, and the small error isn't. E.g. one could correct blocking artifacts which give some local discoloration by multiplying with a countering pattern which brings everything closer to the original HDR, or at least a less annoying object texture (e.g. a more smooth color by decreasing the local contrast by multiplying the blocky texture with coefficients smaller than 1). But furthermore, the grader can tune the mappings even to special HDR effects. E.g. an explosion is a fast effect, in which the flamy texture needs not be reproduced accurately, but its first order properties like contrast need to. The grader can hence determine one or more optimal tables for the multiplicative modifications, e.g. with descriptors 530 of the tables, which indicate they are to be used for certain kinds of objects, or certain indicated window types 531. I.e. if one of the windows is of the flame type, table with descriptor=flame or =1 will be used.

So multipliers table 506 will then instead of the actual multiplication factors just contain indexes of the multiplication factors, which are translated to real multiplication factors with definition table 520. So, e.g., one may be able to correct a HDR prediction value with only the following approximate factors: 2% (or 1.02), 4%, 10%, 50%. This will in general be optimized to what is approximately needed for the given object region, i.e. some fine correction, and then some coarser correction. The mapping table should at least contain one value intermediate the average predicted HDR luma and the average original one, i.e. if the original is 450, and the predicted is 440, with a multiplication factor of 2% we could come much closer already. That would give 1.02 (or 0.98 if the correction was needed in the opposite direction) times 440 equals 448.8 i.e. 449. Had we only encoded the choice of 1% and 3% in the definition table, we could chose to encode the better choice in the multiplier table, i.e. 3%, since 453 is closer to 450 than 444. In general we will optimize the definition tables depending on what kind of errors we expect. If we need only minor corrections, there is absolutely no need to define possible corrections of 300% or 1000%. This can be done automatically e.g. by looking at the statistics of the predicted and original HDR, and especially their per pixel luma diffences Y_HDR_orig_i−Y_HDR_PRED i. If the histogram e.g. shows many cases where, for an average of 450, the difference is between 1 and 10, and few cases where the difference is higher, we may decide to define the definition table 520 with codes for 0.5%, 1%, 2%, 3%, 4%, . . . (less than 0.5% being unnecessary for reasonable qualities).

Apart from multiplication values in the table (which may be smaller than or bigger than 1, or positive/negative percentages) there may be special codes. E.g. the code 0 may be used to indicate that the current pixel or set of pixels in HDR_PRED should not be changed, which is equivalent to encoding a multiplication factor of 1. There may also be codes which indicate some function should be used, e.g. typically taking as input surrounding multiplied/modified pixel values. E.g., a pixel luma/color in HDR_PRED may be far off the required value (e.g. because of a spiky artifact requiring a multiplication outside of the range encoded in the definition table 520), in which case it may be better reconstructed by averaging a couple of surrounding pixels. But this does allow the peculiarities of the LDR_CONT signal such as different grading, compression artefacts, etc.

Figure 4:
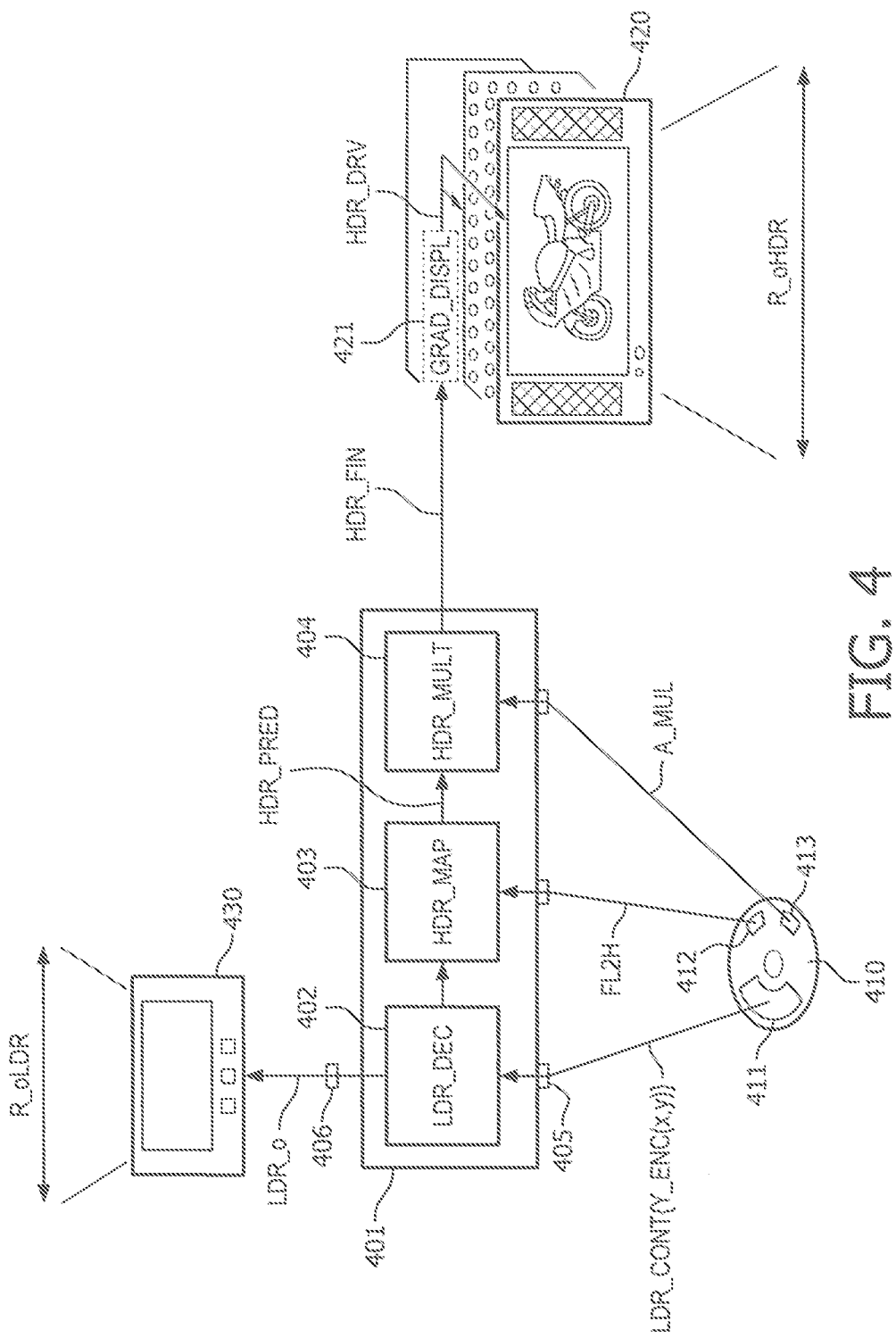
FIG. 4 schematically illustrates on a receiving side a decoding apparatus which gets a possible encoding of an HDR image according to the present invention principles, and is connected to an HDR display.

FIG. 4 shows an example of a HDR image decoding apparatus 401 realization in an image rendering system. We assume the system to be composed of a box which can handle image processing and in this case the decoding, connected to a display 420. This decoding apparatus may be e.g. a BD disk player and the display a 2D LED backlighted LCD television. But the skilled person understands that our embodiments may be realized in many equivalent variants, e.g. to name a few covering the range, the decoding apparatus 401 may be running on a network server in another country (in which the HDR_FIN may e.g. be a dedicated (and possibly enciphered) code for the particular receiving display, the formatting etc. being beyond the teaching of this patent), and the display may be a portable display, or a projection system with a separate projector for a lower resp. higher luminance range of the renderable luminances, etc. Indeed, the decoding apparatus 401 may also be comprised in the display itself. We assume that the encoded data for reconstructing an HDR image in one embodiment is encoded on a blu-ray disk 410, which contains a separate first sector 411 for the pixel image data encoded as a HDR_encoded_as_LDR (LDR_CONT) encoding, e.g. encoded with MPEG-AVC, VC1, VP8, motion JPEG, etc. A second sector 412 contains metadata, typically containing a referenced number of tone mapping functions FL2H (it may be that the color is automatically handled, but of course there may be functions handling the colors too, e.g. on a RED-channel etc.), which typically may be encoded for each shot of the movie, etc., and in various ways, e.g. parametric functions, lookup tables, algorithmic specifications, etc. Although we describe just a single decoding to HDR_PRED, there may of course be data for deriving several final signals e.g. an MDR_PRED for displays of lower peak brightness than for which the HDR_PRED is to be used. A third sector 413 contains the multiplication data A_MUL for the multiplicative modification of at least the lumas of pixels in HDR_PRED. As mentioned this may be encoded in various ways, e.g. typically for single or runs of pixels, a multipliers table 506 will be encoded, which may directly contain multiplication factors according to some encoding (e.g. M_enc=f(M_raw), in which M_raw is the raw multiplication factor e.g. 1.44, and f is a fixed allocation function, e.g. a square root, which yields the factor M_enc as it is directly encoded in table 506), or may contain indices to factors which are stored elsewhere in definition table 520, which is preferably closeby in the same third sector 413. Of course other metadata may be encoded, like a first function F1 and second function F2 (e.g. (Y_left_neighbour+Y_right_neighbour)/2) to be used for pixels having the special codes attached in the multipliers table 506. This data is read via at least one input 405. The decoding apparatus 401 typically contains a decoder 402 arranged to decode the typically image compressed variant of the LDR_CONT signal, which may e.g. involve run length decoding, IDCT, etc. A tone mapper 403 uses the tone mapping function(s) FL2H to derive a prediction of the required HDR signal HDR_PRED. Then a pixel color modifier 404 changes at least the lumas of the pixels in HDR_PRED by applying the multiplicative modification as encoded in A_MUL. This yields a final signal which is outputted over an output, e.g. to a display (alternatively this could be a storage device, client computer, etc.). The display 420 may still apply its own optimal tone/color mapping to the HDR_FIN input signal by means of its display pixel color modifier 421, finally yielding drive values of a driving signal HDR_DRV for in this case the LED backlight and LCD (and in the two projector example, the pixels of its DMDs e.g., and for a single panel solution like e.g. an OLED a single drive signal for its pixels). There may be a second output 406 on the apparatus to provide an LDR output image/video LDR_o, e.g. wireless to a mobile display 430. The high dynamic range R_oHDR of display 420 and the low dynamic range R_oLDR that the LDR display 430 is capable of rendering, are shown schematically.

Figure 7:
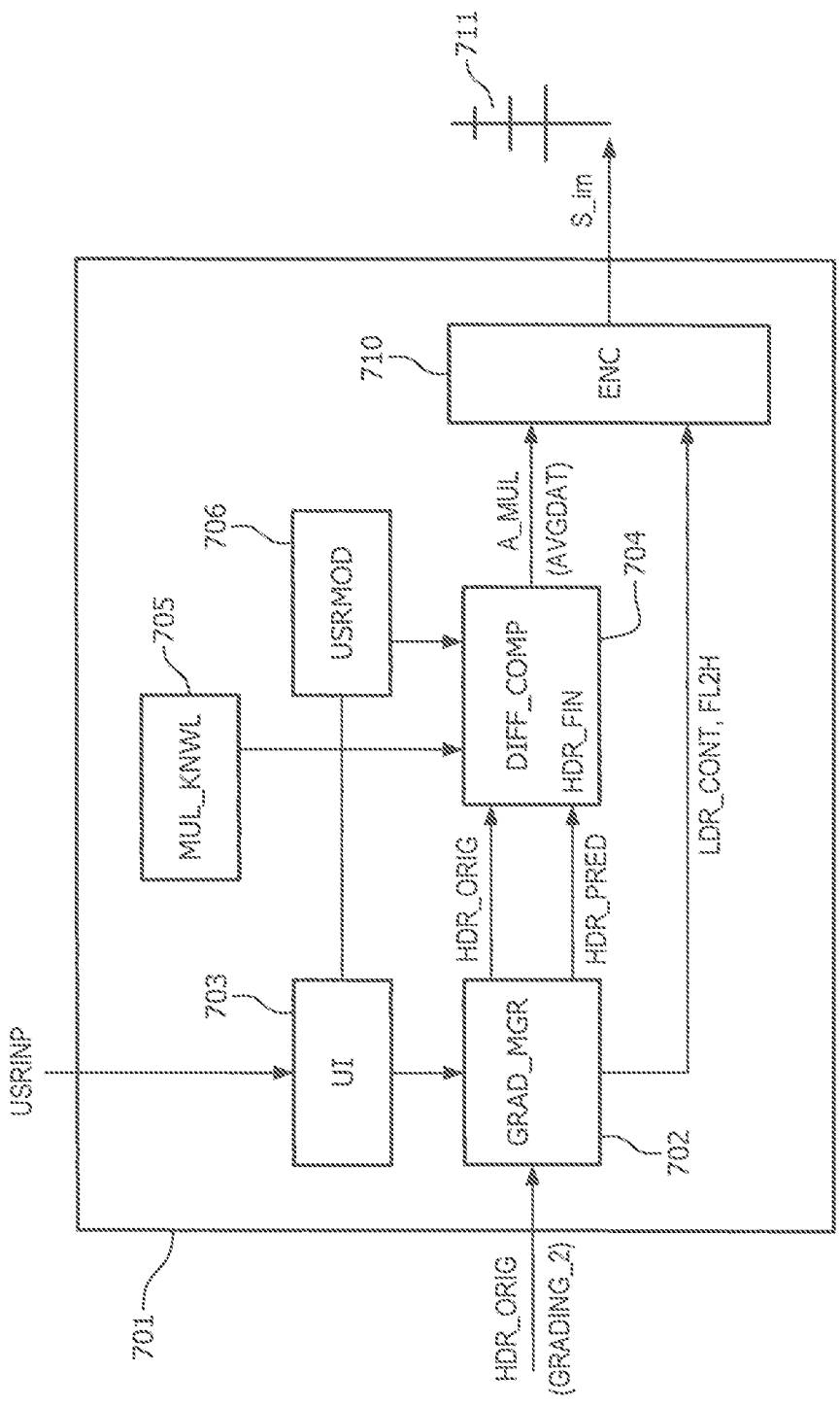

FIG. 7 shows an exemplary realization of an HDR image encoding apparatus 701. An important unit is the grading manager 702. It allows a grader to make gradings. It gets at least an original HDR file HDR_ORIG, for which we will assume it is already a master HDR grading, i.e. what the content creator like the movie director together with his artistic staff have decided what the film look should be (e.g., in an evening scene of an action movie, he has decided to go with a pale muddy and very dark look for the buildings, with a harsch, high luminance and saturated look for the colored TL tubes of commercial signs hanging in the street). Normally, he will want similar looks for all derived gradings, be it of course that e.g. a DVD or youtube grading should fulfill the limitations and characteristics of that technology. Of course alternative realizations may have as an HDR_ORIG the raw camera signal, e.g. a linear luminance color space composition of two camera captures with different exposure durations composed together, in which case he will use the grading manager 702 to create the master grading. But typically this may be done at different times in the workflow. E.g., with digital filming, part of the (pre)grading is already moving to the shooting day, where the director still has a fresh memory of his creative view, and what the actual scene looked like. But because of the huge amount of work in grading, and the hectic shooting schedule, at least the work on a lesser grading like the BD grading may be postponed till after the movie has been completed. Of course the HDR image encoding apparatus 701 could also as input have several gradings, e.g., there may already be a first LDR grading, to which the grader should more or less closely tune his LDR_CONT grading, or another optional grading GRADING_2, which may be some other HDR grading to be used under different rendering conditions, or for a different artistic version of the movie, etc. In any case, typically a grader will use the grading manager 702 to derive an LDR grading on the basis of HDR_ORIG. So typically the grading manager comprises units allowing to apply mappings between a first and a second grading (e.g. in software), which involves typically constructing an arbitrary tone mapping curve by clicking on points on the curve at arbitrary x-positions, and moving them to arbitrary y-positions. There may also be means to cycle through families of parametric tone mapping curves. There may be means to select a region like an ellipse (which need not be the region for applying our multiplicative modification, since that can be the encompassing rectangle of the ellipse e.g.), and the do processing locally. In an HDR_encoded_as_LDR or LDR container grading, typically these mapping may be constrained so that reversibility is guaranteed. E.g., the grader may only construct functions which leave sufficient data precision allowing a good quality HDR_PRED, or at least, functions which are invertible, i.e. piecewise monotonous. But typically the grader may be allowed to do grading operations which are not invertible, but then he may get a warning about that, so that he limits his amount of irreversible grading. He can then continue e.g. by coloring some isolated pixels arbitrarily. The grading manager 702 is arranged to not only implement image mappings and modifications, but also to track the modification data corresponding to that (e.g. the definitions of tone mapping curves, changed pixel colors, etc.), and allowing further processing, typically reverting to the original HDR, and which data also defines the LDR_CONT grading/encoding. Typically a user interface unit 703 allows the grader to give his user input USRINP to the grading manager 702. We will not dive into the details of that, since the skilled person will know what it is, and e.g. there may be a dedicated grading console connected, and software tracks e.g. if a user pushes a button how a tone mapping function changes. Whereas the artistic grader usually has full control over the creation of the LDR grade LDR_CONT (although it may be semi-automatically guided, e.g. an algorithm may already based on information theoretic considerations such as a histogram of images in a shot, derive a first tone mapping which places the various image objects/subregions in well visible and appropriate luminance subranges), and well so make a luminance-wise optimal looking image i.e. an image in which typically all object structures are reasonably visible and inter-object contrast is optimized to give a particular look to the image, he may not wish to be bothered too much by the multiplicative modification part. So, although some embodiments may offer at least some grader control also over this part, other embodiments may do this multiplicative modification part automatically. This is done by a grading difference comparator 704. It may e.g. typically get as input the predicted HDR_PRED based on whatever the LDR_CONT intermediately or finally turns out to be, and the ORIG_HDR, and then compares how they differ. This comparison algorithm may be guided by the local regions the grader paid attention to, but in general may also look at the prediction quality of regions which the grader didn't process separately. The grading difference comparator 704 is arranged to select a number of regions for which a multiplicative modification is necessary, because the two HDR gradings (HDR+PRED vs. HDR_ORIG) differ too much. This is where also in some embodiments grader input may complement the mathematical algorithms determining the relevant grading differences, by e.g. using psychovisual models of the visibility of regional color errors. A user grading modification unit 706 is arranged to adapt at least some parameters of the grading difference comparator 704. E.g., in a simple embodiment, the grading difference comparator 704 may have determined say 4 regions of the image for which it defines a multiplicative modification with an array of multiplication factors (encoded in A_MUL). The grader may consider two of these regions are not changed that much, i.e. were not so bad in the prediction HDR_PRED in the first place. The user grading modification unit 706 may for this implement a software module which allows the grader to toggle between the region as multiplicatively modified and the original HDR_PRED within the e.g. rectangle, or other encoded shape, and to look at the visibility when rendering both intermittently on a reference HDR display. He may then delete two regions from the list of to be modified regions, meaning that only the other two are encoded in the multiplicative modification data A_MUL. And he may select another e.g. rectangular region, in which he considers an improving modification should be done. Typically the grading difference comparator 704 will determine the multiplicative modification data A_MUL and in particular the multiplication factors and the basis of data prestored in a multiplication knowledge data base 705. This may e.g. store one or more definition tables 520 or similar for defining multiplication factors, and e.g. models for how the grading difference comparator 704 will convert a difference into a multiplication factor. E.g., in a simple model 704 may look at the per pixel luma differences, convert them to a multiplicative modification factor (e.g. Y_HDR_ORIG−Y_HDR_PRED=m*Y_HDR_PRED; Y_HDR_ORIG=Y_HDR_PRED+m*Y_HDR_PRED), and then map these multiplication factors to the closest one available in a particularly chosen definition table 520. The particular definition table 520 may e.g. be chosen by the grader, or automatically by the grading difference comparator 704 depending on how suitable each table is, e.g. by calculating a cumulative remaining error measure over at least one image or regions thereof (which may be weighed by factors looking e.g. at importance of objects like them being faces, or more centrally positioned in the image etc.). A more complex algorithm may calculate e.g. a semiglobal difference in color encoding or appearance over entire objects. It may therefrom derive e.g. first a global multiplication factor, and then further finetune per pixel, etc. As said above, the user may of course also influence those parameters. E.g., if the chosen definition table(s) do not yield sufficient precision of similarity to HDR_ORIG of the multiplicative modified HDR_FIN (which typically is intermediate data in or related with 704 which need not be outputted), the user may determine (a) new definition table(s) 520. That may be done semiautomatically by e.g. pushing an "increase precision" button, in which case the definition table will store more possible multiplication factors, at the cost of a higher bit budget. Or the user may specifically define his own values, e.g. by clicking on regions of an object texture he desires to be accurately rendered, etc. As said also, there may further be optional averaging specification data AVGDAT which may specify how local averages are defined, and in some embodiments the grader may also be offered the option to act on this data. Finally an encoding unit 710 then groups everything together (i.e. the LDR_CONT image in whatever way it was to be encoded, e.g. MPEG_AVC compressed, the image mapping data like tone mapping function FL2H and the multiplicative modification data A_MUL in whatever way it was encoded), and encodes this in an output image signal S_im in whichever way this signal prescribes. The skilled person understands this precise metadata formatting is no critical component of this invention, but may typically involve putting it in a specific reserved position of the image signal S_im, e.g. a part which is ignored by older decoders, giving it a specific data structural form, associating it with reserved name and/or type codes, etc. This image may then be encoded e.g. on the BD disk of FIG. 4, or be sent over an antenna 711, etc. Although we used a couple of examples to elucidate the invention in general, the skilled person understands there are many alternative ways to realize the same.

Figure 8:
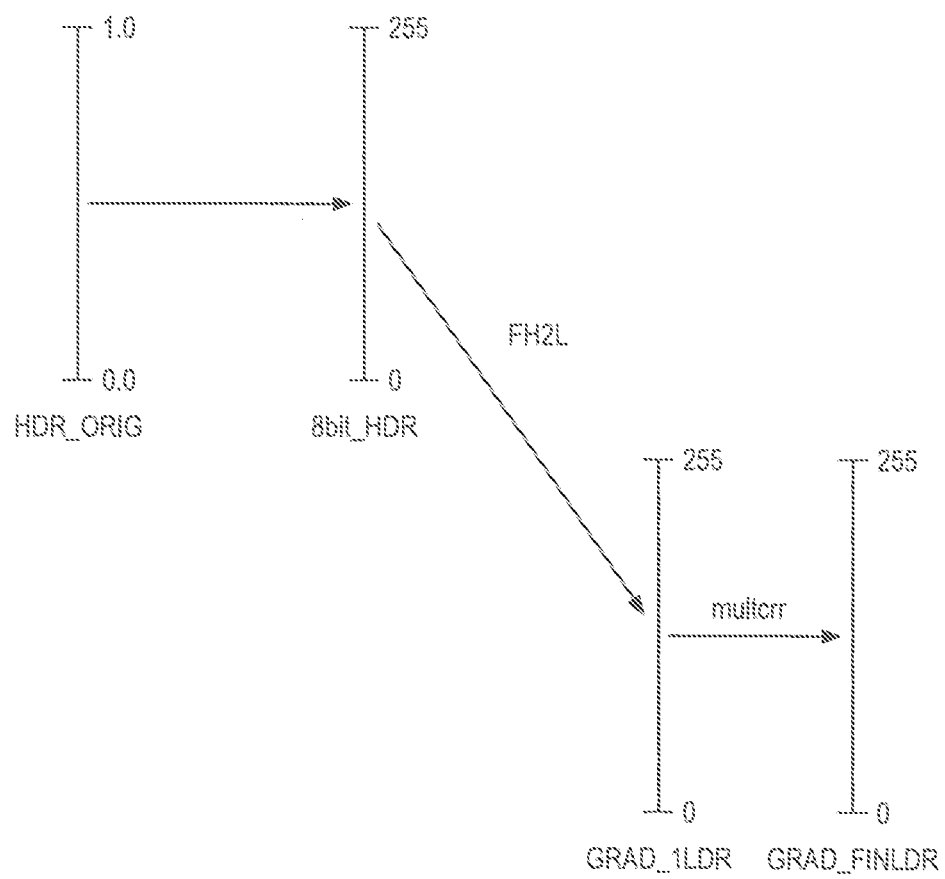
FIG. 8 schematically illustrates another encoding example of applying the present concepts than in a scenario wherein a grade usable for LDR/legacy displays is encoded as the main image texture pixel data.

FIG. 8 shows another possible scenario for 8 bit encoding of a capturing of an original HDR scene. In this case an 8 bit HDR image is created (8 bit-HDR) i.e. an image which would be directly usable on an HDR display of say 3000 nit. It may be generated by simple linear mapping of [0,1] to [0,255] and quantizing e.g. Now the grader maps therefrom with a simple mapping, e.g. a global mapping a primary 8 bit LDR grade (GRAD_1LDR), and although it is quite usable according to a philosophy of relating different rendering dynamic range gradings with a single 8 bit image and a tone mapping, and may give some reasonable picture when rendered on an LDR display, the grader may not be entirely happy. For a few critical regions he may then apply the multiplicative modification, to arrive at a final 8 bit LDR grading GRAD_FINLDR. In this case one would encode the 8 bit_HDR, the downwards mapping simple tone mapping strategy, e.g. global tone mapping function FH2L, and the multiplication factors data, which in this case codes a difference between the GRAD_FINLDR and what can be simply obtained by applying the downwards mapping to the 8 bit_HDR encoding.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection-wired or wireless-, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. A computer readable medium, that is not a transitory propagating signal or wave, the medium comprising control information for controlling an operation of a device for decoding an image encoding (LDR_CONT) corresponding to a first luminance dynamic range (R_oLDR) into a second luminance dynamic range (R_oHDR) output image (HDR_FIN), in which image encoding (LDR_CONT) are encoded pixels of an original image (HDR_ORIG) of a high dynamic range scene, the device comprising a processo configured forr:

tone mapping with a predetermined tone mapping strategy (FL2H) at least lumas of pixels in the image encoding (LDR_CONT) onto lumas of pixels in an intermediate image (HDR_PRED) corresponding to the second luminance dynamic range (R_oHDR); and modifying the lumas of at least some of the pixels of the intermediate image (HDR_PRED) by multiplying them with predetermined multiplication factors, the predetermined multiplication factors representing a multiplicative correction to be applied to the lumas of the at least some of the pixels of the intermediate image for obtaining a correction of the tone mapping from the first luminance dynamic range to the second luminance dynamic range, resulting in the output image (HDR_FIN).

2. A computer readable medium, that is not a transitory propagating signal or wave, and containing data thereon, said data comprising:
an HDR image signal comprising:
an image encoding (LDR_CONT) corresponding to a first luminance dynamic range (R_oLDR);
tone mapping data (FL2H); and
multiplication factor data (A_MUL), comprising at least one multiplication factor, wherein when accessed by a processing system causing the processing system to:
tone map, using the tone mapping data, the image encoding (LDR_CONT) into an intermediate image (HDR_PRED) corresponding to a second luminance dynamic range (R_oHDR); and
multiply, using the multiplication factor data, with luma of at least one pixel in the intermediate image (HDR_PRED), the at least one multiplication factor representing a multiplicative correction to be applied to the luma of the at least one pixel of the intermediate image for obtaining a correction of the tone mapping from the first luminance dynamic range to the second luminance dynamic range which results in an output image.

3. A portable data device, comprising:
an input to receive an HDR image data;
an output for providing HDR image data in data structures configured for decoding and displaying the HDR image data, wherein said HDR image data comprising:
an image encoding (LDR_CONT) corresponding to a first luminance dynamic range (R_oLDR);
tone mapping data (FL2H) to be used for tone mapping the image encoding (LDR_CONT) into an intermediate image (HDR_PRED) corresponding to a second luminance dynamic range (R_oHDR); and
multiplication factor data (A_MUL), comprising at least one multiplication factor to be used for multiplying with the luma of at least one pixel in the intermediate image (HDR_PRED), the at least one multiplication factor representing a multiplicative correction to be applied to the luma of the at least one pixel of the intermediate image for obtaining a correction of the tone mapping from the first luminance dynamic range to the second luminance dynamic range which results in an output image.

4. A computer readable medium, that is not a transitory propagating signal or wave, containing control information for controlling an operation of a data device when accessed by the data device, the data device comprising:
an input to receive an HDR image data; and
an output for providing HDR image data in data structures configured for decoding and displaying the HDR image data, wherein said HDR image data comprising:
an image encoding (LDR_CONT) corresponding to a first luminance dynamic range (R_oLDR);
tone mapping data (FL2H) to be used for tone mapping the image encoding (LDR_CONT) into an intermediate image (HDR_PRED) corresponding to a second luminance dynamic range (R_oHDR); and
multiplication factor data (A_MUL), comprising at least one multiplication factor to be used for multiplying with the luma of at least one pixel in the intermediate image (HDR_PRED), the at least one multiplication factor representing a multiplicative correction to be applied to the luma of the at least one pixel of the intermediate image for obtaining a correction of the tone mapping from the first luminance dynamic range to the second luminance dynamic range which results in an output image.

5. An HDR image decoding apparatus comprising:
a decoder configured to obtain an image encoding (LDR_CONT) corresponding to a first luminance dynamic range (R_oLDR);
a tone mapper configured to obtain a specification of a tone mapping strategy (FL2H), and to apply the tone mapping strategy to the image encoding (LDR_CONT) yielding an intermediate image (HDR_PRED) corresponding to a second luminance dynamic range (R_oHDR); and
a pixel color modifier configured to obtain multiplication factor data (A_MUL) comprising at least one multiplication factor, and arranged to multiply the at least one multiplication factor with the luma of at least one pixel in the intermediate image (HDR_PRED), the at least one multiplication factor representing a multiplicative correction to be applied to the luma of the at least one pixel of the intermediate image for obtaining a correction of the tone mapping from the first luminance dynamic range to the second luminance dynamic range, yielding as output an output image (HDR_FIN).

6. The HDR image decoding apparatus of claim 5, wherein the first luminance dynamic range is a low dynamic range, corresponding to a peak brightness of the range of 500nit or lower, and the second luminance dynamic range is a high dynamic range, having a peak brightness of at least 750 nit.

7. The HDR image decoding apparatus of claim 5, wherein the predetermined multiplication factors are stored in metadata associated with the image encoding (LDR_CONT), wherein the decoding comprising reading in the metadata information defining a spatial region of the image encoding (LDR_CONT) for which at least one multiplication factor is encoded in the metadata, of which spatial region a geometric shape is encoded in the metadata.

8. The HDR image decoding apparatus of claim 7, wherein the predetermined multiplication factors are comprised in an array of multiplication factors comprising a multiplication factor per pixel or group of pixels, in which the array is defined in correspondence with the encoding of the spatial region geometric shape.

9. The HDR image decoding apparatus of claim 8, wherein the multiplication factors in the array of multiplication factors are encoded as indices into a definition table, which contains actual multiplication factors for the indices.

10. The HDR image decoding apparatus of claim 9, wherein the definition table is associated with a descriptor, which characterizes the definition table, and modifying the lumas to be used.

11. The HDR image decoding apparatus of claim 10, wherein the decoding further reads a window type , indicating that a spatial region associated with that window type has multiplication factors encoded by means of a definition table associated with a descriptor with corresponds with the window type.

12. The HDR image decoding apparatus of claim 5, wherein the modifying the lumas of at least some of the pixels of the intermediate image (HDR_PRED) is performed in a manner which constrains the multiplying to a multiplying strategy in which a local average luminance of the output image (HDR_FIN) is within a predetermined perceptual deviation from a local average luminance of the intermediate image (HDR_PRED).

13. The HDR image decoding apparatus of claim 12, wherein a type value is read, indicating that the multiplication factors are defined in relation to such a constrained multiplying.

14. The HDR image decoding apparatus of claim 5, wherein the multiplication factors are read from the metadata as a functional definition of multiplication factors over a running 1-dimensional or 2-dimensional position coordinate.

15. A computer readable medium, that is not a transitory propagating signal or wave, the medium comprising control information, when loaded into an HDR image decoding apparatus controlling an operation of the HDR image decoding apparatus, the HDR image decoding apparatus comprising:
- a decoder arranged to obtain an image encoding (LDR_CONT) corresponding to a first luminance dynamic range (R_oLDR);
- a tone mapper arranged to obtain a specification of a tone mapping strategy (FL2H), and to apply the tone mapping strategy to the image encoding (LDR_CONT) yielding an intermediate image (HDR_PRED) corresponding to a second luminance dynamic range (R_oHDR); and
- a pixel color modifier arranged to obtain multiplication factor data (A_MUL) comprising at least one multiplication factor, and arranged to multiply the at least one multiplication factor with the luma of at least one pixel in the intermediate image (HDR_PRED), the at least one multiplication factor representing a multiplicative correction to be applied to the luma of the at least one pixel of the intermediate image for obtaining a correction of the tone mapping from the first luminance dynamic range to the second luminance dynamic range, yielding as output an output image (HDR_FIN).

16. The HDR image decoding apparatus of claim 15, wherein the first luminance dynamic range is a low dynamic range, corresponding to a peak brightness of the range of 500 nit or lower, and the second luminance dynamic range is a high dynamic range, having a peak brightness of at least 750 nit.

17. The HDR image decoding apparatus of claim 5, wherein the predetermined multiplication factors are stored in metadata associated with the image encoding (LDR_CONT), the decoding comprising reading in the metadata information defining a spatial region of the image encoding (LDR_CONT) for which at least one multiplication factor is encoded in the metadata, of which spatial region a geometric shape is encoded in the metadata.

18. The HDR image decoding apparatus of claim 17, wherein the predetermined multiplication factors are comprised in an array of multiplication factors comprising a multiplication factor per pixel or group of pixels, in which the array is defined in correspondence with the encoding of the spatial region geometric shape.

19. The HDR image decoding apparatus of claim 18, wherein the multiplication factors in the array of multiplication factors are encoded as indices into a definition table, which contains actual multiplication factors for the indices.

20. The HDR image decoding apparatus of claim 19, wherein the definition table is associated with a descriptor, which characterizes the definition table, and modifying the lumas to be used.

21. The HDR image decoding apparatus of claim 20, wherein the decoding further reads a window type indicating that a spatial region associated with that window type has multiplication factors encoded by means of a definition table associated with a descriptor with corresponds with the window type.

22. The HDR image decoding apparatus of claim 5, wherein the modifying the lumas of at least some of the pixels of the intermediate image (HDR_PRED) is performed in a manner which constrains the multiplying to a multiplying strategy in which a local average luminance of the output image (HDR_FIN) is within a predetermined perceptual deviation from a local average luminance of the intermediate image (HDR_PRED).

23. The HDR image decoding apparatus of claim 22, wherein a type value is read, indicating that the multiplication factors are defined in relation to such a constrained multiplying.

24. The HDR image decoding apparatus of claim 5, wherein the multiplication factors are read from the metadata as a functional definition of multiplication factors over a running 1-dimensional or 2-dimensional position coordinate.

* * * * *